US 11,258,879 B2

(12) United States Patent
Ioannidis et al.

(10) Patent No.: US 11,258,879 B2
(45) Date of Patent: Feb. 22, 2022

(54) JOINT ROUTING AND CACHING METHOD FOR CONTENT DELIVERY WITH OPTIMALITY GUARANTEES FOR ARBITRARY NETWORKS

(71) Applicant: Northeastern University, Boston, MA (US)

(72) Inventors: Efstratios Ioannidis, Boston, MA (US); Edmund Meng Yeh, Newton, MA (US)

(73) Assignee: Northeastern University, Boston, MA (US)

( * ) Notice: Subject to any disclaimer, the term of this patent is extended or adjusted under 35 U.S.C. 154(b) by 0 days.

(21) Appl. No.: 16/623,599

(22) PCT Filed: Jun. 18, 2018

(86) PCT No.: PCT/US2018/038024
§ 371 (c)(1),
(2) Date: Dec. 17, 2019

(87) PCT Pub. No.: WO2018/236723
PCT Pub. Date: Dec. 27, 2018

(65) Prior Publication Data
US 2020/0137192 A1    Apr. 30, 2020

Related U.S. Application Data

(60) Provisional application No. 62/521,719, filed on Jun. 19, 2017.

(51) Int. Cl.
*H04L 29/08*    (2006.01)
*H04L 67/63*    (2022.01)
*H04L 67/568*    (2022.01)

(52) U.S. Cl.
CPC ........ *H04L 67/327* (2013.01); *H04L 67/2842* (2013.01)

(58) Field of Classification Search
CPC . H04L 67/104; H04L 67/327; H04L 67/1097; H04L 67/2842; H04L 45/64;
(Continued)

(56) References Cited

U.S. PATENT DOCUMENTS 7,395,348 B1 * 7/2008 Cieslak ................ H04L 45/306
709/232
7,516,198 B1 * 4/2009 Appala .................. H04L 45/02
707/999.004
(Continued)

FOREIGN PATENT DOCUMENTS

| CN | 106686060 A | * | 5/2017 | |
| WO | WO-2015161737 A1 | * | 10/2015 | ......... H04L 67/2842 |
| WO | 2018236723 A1 | | 12/2018 | |

OTHER PUBLICATIONS

Ageev, et al., "Pipage Rounding: A New Method of Constructing Algorithms with Proven Performance Guarantee*," Journal of Combinatorial Optimization, 8, 307-328, 2004.
(Continued)

*Primary Examiner* — Kostas J Katsikis
(74) *Attorney, Agent, or Firm* — Hamilton, Brook, Smith & Reynolds, P.C.

(57) ABSTRACT

Embodiments solve a problem of minimizing routing costs by jointly optimizing caching and routing decisions over an arbitrary network topology. Embodiments solve an equivalent caching gain maximization problem, and consider both source routing and hop-by-hop routing settings. The respective offline problems are non-deterministic polynomial time (NP)-hard. Nevertheless, embodiments show that there exist polynomial time approximation methods producing solutions within a constant approximation from the optimal. Embodiments herein include distributed, adaptive networks, computer methods, systems, and computer program products that provide guarantees of routing cost reduction. Simu-
(Continued)

lation is performed over a broad array of different topologies. Embodiments reduce routing costs by several orders of magnitude compared to existing approaches, including existing approaches optimizing caching under fixed routing.

23 Claims, 16 Drawing Sheets

(58) Field of Classification Search
CPC . H04L 45/127; H04L 45/306; G06F 12/0802; G06F 12/0866; G06F 16/9574; G06F 3/0601
See application file for complete search history.

(56) References Cited

U.S. PATENT DOCUMENTS

| | | | | |
|---|---|---|---|---|
| 7,725,598 | B2* | 5/2010 | Cieslak | H04L 67/327 709/238 |
| 10,291,748 | B1* | 5/2019 | Dods | H04L 69/16 |
| 10,530,893 | B2* | 1/2020 | Rossi | H04L 67/2842 |
| 2004/0034746 | A1* | 2/2004 | Horn | G06F 12/0866 711/141 |
| 2008/0222305 | A1* | 9/2008 | Cieslak | H04L 67/2842 709/241 |
| 2012/0209942 | A1* | 8/2012 | Zehavi | H04L 67/2842 709/213 |
| 2013/0013726 | A1* | 1/2013 | Westberg | H04L 67/2847 709/213 |
| 2013/0018937 | A1* | 1/2013 | Kim | G06F 16/9574 709/202 |
| 2014/0164552 | A1* | 6/2014 | Kim | H04L 67/2842 709/214 |
| 2014/0173034 | A1* | 6/2014 | Liu | H04L 67/1065 709/217 |
| 2016/0014027 | A1* | 1/2016 | Oran | H04L 63/101 709/213 |
| 2016/0234333 | A1 | 8/2016 | Yeh et al. | |
| 2017/0041421 | A1* | 2/2017 | Liu | H04L 67/2842 |
| 2020/0137192 | A1* | 4/2020 | Ioannidis | H04L 45/127 |

OTHER PUBLICATIONS

Poularakis, et al., "Approximation Caching and Routing Algorithms for Massive Mobile Data Delivery," Globecom 2013—Wireless Communications Symposium.
Xie, et al., "TECC: Towards Collaborative In-network Caching Guided by Traffic Engineering," The 31st Annual IEEE International Conference on Computer Communications: Mini-Conference, 2012.
Abedini, N. and S. Shakkottai, "Content caching and scheduling in wireless networks with elastic and inelastic traffic," IEEE/ACM Transactions on Networking, 22(3): 864-874 (2014).
Albers, S., "Online algorithms: a survey," Mathematical Subject Classification (1991).
Applegate, D., et al., "Optimal content placement for a large-scale VoD system," in IEEE/ACM Transactions on Networking, vol. 24, No. 4, Aug. 2016.
Baev, I., et al., "Approximation algorithms for data placement problems," SIAM Journal on Computing, 38(4): 1411-1429 (2008).
Bartal, Y., et al., "Competitive algorithms for distributed data management," Journal of Computer and System Sciences, 51(3): 341-358 (1995).
Berger, D. S., et al., "Exact analysis of TTL cache networks," IFIP Performance, 2014.
Borst, S., et al., "Distributed caching algorithms for content distribution networks," in INFOCOM, 2010.
Calinescu, G., et al., "Maximizing a submodular set function subject to a matroid constraint," in Integer programming and combinatorial optimization, Springer, 2007, pp. 182-196.

Carofiglio, G., et al., "Joint forwarding and caching with latency awareness in information-centric networking," Computer Networks, 110:133-153 (2016).
Che, H., et al., "Hierarchical web caching systems: Modeling, design and experimental results," Selected Areas in Communications, 20(7): 1305-1314 (2002).
Chiocchetti, R., et al., "Exploit the known or explore the unknown?" in ICN, (2012).
Cohen, E. and S. Shenker, "Replication strategies in unstructured peer-to-peer networks," in SIGCOMM, 2002.
Cormen, T., et al., Introduction to Algorithms, MIT Press, 2009.
Dehghan, M., et al., "On the complexity of optimal routing and content caching in heterogeneous networks," in INFOCOM, 2014.
Dehghan, M., et al., "A utility optimization approach to network cache design," in INFOCOM, 2016.
Edmonds, J., "Submodular functions, matroids, and certain polyhedra," Edited by G. Goos, J. Hartmanis, and J. van Leeuwen, vol. 11 (1970).
Eppstein, D., "Finding the k shortest paths," 26 pages, Mar. 31, 1997.
Fayazbakhsh, S. K., et al., "Less pain, most of the gain: Incrementally deployable icn," in ACM SIGCOMM Computer Communication Review, vol. 43, No. 4, ACM, 2013, pp. 147-158.
Fleischer, L., et al., "Tight approximation algorithms for maximum general assignment problems," in SODA, 2006.
Fofack, N. C., et al., "Analysis of TTL-based cache networks," in VALUETOOLS, 2012.
Fricker, C., et al., "A versatile and accurate approximation for LRU cache performance," in ITC, 2012.
Goemans, M. X. and D. P. Williamson, "New 3/4-approximation algorithms for the maximum satisfiability problem," SIAM Journal on Discrete Mathematics, 7(4): 656-666 (1994).
Nemhauser, G. L., et al., "An analysis of approximations for maximizing submodular set functions—i," Mathematical Programming, 14(1): 265-294 (Dec. 1978).
He, J. and J. Rexford, "Toward internet-wide multipath routing," IEEE network, 22(2) (2008).
Hopps, C. E., "Analysis of an equal-cost multi-path algorithm," 2000, iETF RFC2992.
Ioannidis, S. and P. Marbach, "Absence of evidence as evidence of absence: A simple mechanism for scalable p2p search," in ITechnical Report, University of Toronto, Aug. 29, 2008.
Ioannidis, S. and E. Yeh, "Adaptive caching networks with optimality guarantees," in SIGMETRICS'16, Jun. 14-18, 2016, France.
Ioannidis, et al., "Jointly optimal routing and caching for arbitrary network topologies," in ACM ICN, 2017.
Jacobson, V., et al., "Networking named content," in CoNEXT, 2009.
Krause, A. and D. Golovin, "Submodular function maximization," 28 pages, 2012.
Kurose, J. F. and K. W. Ross, Computer Networking: a Top-Down Approach, Addison Wesley, 2007.
Laoutaris, N., et al., "Meta algorithms for hierarchical web caches," in ICPCC, 2004.
Laoutaris, N., et al., "The LCD interconnection of LRU caches and its analysis," 33 pages (2006).
Marina, M. K. and S. R. Das, "On-demand multipath distance vector routing in ad hoc networks," in Network Protocols, 2001. Ninth International Conference on IEEE, 2001, p. 14 23.
Martina, V., et al., "A unified approach to the performance analysis of caching systems," in INFOCOM, 2014.
Michelot, C., "A finite algorithm for finding the projection of a point onto the canonical simplex of $R^{\wedge}n$," Journal of Optimization Theory and Applications, 50(1): 195-200 (1986).
Naveen, K., et al., "On the interaction between content caching and request assignment in cellular cache networks," in ATC, 2015.
Nemhauser, G. L. and L. A. Wolsey, "Best algorithms for approximating the maximum of a submodular set function," Mathematics of operations research, 3(3): 177-188 (1978).
Nemirovski, A., Efficient methods in convex programming, Fall semester 1994/1995.
Nitzberg, B. and V. Lo, "Distributed shared memory: A survey of issues and algorithms," Computer, 24(8): 52-60 (1991).

(56) References Cited

OTHER PUBLICATIONS

Jiang, W., et al., "Orchestrating massively distributed cdns," in CoNEXT, 2012.
Papadimitriou, C. H. and K. Steiglitz, Combinatorial optimization: algorithms and complexity, Courier Corporation, 1982.
Podlipnig, S. and L. Boszormenyi, "A survey of web cache replacement strategies," ACM Computing Surveys (CSUR), 35(4): 374-398 (2003).
Psaras, I., et al., "Probabilistic in-network caching for information-centric networks," in ICN (2012).
Rosensweig, E. J., et al., "Approximate models for general cache networks," in INFOCOM IEEE, 2010, pp. 1-9.
Rosensweig, E. J., et al., "On the steady-state of cache networks," in INFOCOM, 2013.
Rossi, D. and G. Rossini, "Caching performance of content centric networks under multi-path routing (and more)," Telecom ParisTech, Tech. Rep., 2011.
Rossini, G. and D. Rossi, "Coupling caching and forwarding: Benefits, analysis, and implementation," in Proceedings of the 1st international conference on Information-centric networking ACM, 2014, pp. 127-136.
Shanmugam, K., et al., "Femtocaching: Wireless content delivery through distributed caching helpers," Transactions on Information Theory, 59(12): 8402-8413 (2013).
Vondrák, J., "Optimal approximation for the submodular welfare problem in the value oracle model," in STOC, 2008.
International Search Report and Written Opinion for Int'l Application No. PCT/US2018/038024, titled: Joint Routing and Caching Method for Content Delivery With Optimality Guarantees for Arbitrary Networks, dated Sep. 11, 2018.
Wang, et al., "An Optimal Cache Management Framework for Information-Centric Networks With Network Coding", IFIP Networking Conference, Jun. 2, 2014, pp. 1-9, XP032620590, [retrieved on Jul. 16, 2014].
International Preliminary Report on Patentability for Int'l Application No. PCT/US2018/038024, titled: Joint Routing and Caching Method for Content Delivery With Optimality Guarantees for Arbitrary Networks, dated Dec. 24, 2019.
Vutukury, S. and J. J. Garcia-Luna-Aceves, "Mdva: A distance-vector multipath routing protocol," in INFOCOM 2001. Twentieth Annual Joint Conference of the IEEE Computer and Communications Societies. Proceedings. IEEE, vol. 1, 2001, pp. 557-564.
Wang, Y., et al., "Optimal cache allocation for content-centric networking," in 2013 21st IEEE International Conference on Network Protocols (ICNP). IEEE, 2013, pp. 1-10.
Blaszczyszyn, B. and A. Giovanidis, "Optimal geographic caching in cellular networks," in ICC, 2015.
Yeh, E., et al., "VIP: A framework for joint dynamic forwarding and caching in named data networks," in ICN, 2014.
Yen, J. Y., "Finding the k shortest loopless paths in a network," management Science, 17(11): 712-716 (1971).
Zhou, Y., et al., "Second-level buffer cache management," Parallel and Distributed Systems, 15(7) (2004).
Calinescu, G., et al., "Maximizing a submodular set function subject to a matroid constraint," Extended Abstract, 15 pages, 2007.
Zhang, et al., "Service-centric traffic engineering and cache orchestration in an ICN-enabled network," IEEE CCNC Conference, 2014.

\* cited by examiner

CENTRALIZED CONTROLLER

DISTRIBUTED

JOINT ROUTING AND CACHING METHOD FOR CONTENT DELIVERY WITH OPTIMALITY GUARANTEES FOR ARBITRARY NETWORKS

RELATED APPLICATION

This application is the U.S. National Stage of International Application No. PCT/US2018/038024, filed Jun. 18, 2018, which designates the U.S., published in English, which claims the benefit of U.S. Provisional Application No. 62/521,719, filed Jun. 19, 2017. The entire teachings of the above applications are incorporated herein by reference.

GOVERNMENT SUPPORT

This invention was made with government support under Grant Nos. CNS-1423250 and CNS-1718355 from the National Science Foundation. The government has certain rights in the invention.

BACKGROUND

Modern computer networks take advantage of routing, caching, and forwarding decisions in order to improve efficiency and packet throughput and latency. Improvements in these areas are needed.

SUMMARY

Embodiments of the present disclosure are directed to networks, computer methods, systems, and computer program products that operate in networks that route requests in a network and replicate and store contents. According to some embodiments, routing decisions, e.g., determining where requests should be forwarded, and caching and storage decisions, e.g., determining where content should be stored, are jointly determined by the networks, computer methods, systems, and computer program products herein. Through this method, embodiments of the present disclosure are directed to networks, computer methods, systems, and computer program products for delivering content in a more efficient manner than existing methods that do not jointly consider routing and caching parameters.

In some embodiments, a network includes network nodes configured to cache content and to route a unit of content in response to a user request to deliver at least the unit of content to a destination node. The controller may be configured to cause at least a subset of the network nodes to adapt caching and routing decisions. The controller may be configured to cause at least the subset of the network nodes to adapt the caching and routing decisions in a manner that jointly considers caching and routing parameters to deliver at least the unit of content to the destination node.

It should be understood that embodiments in the form of computer methods, systems, and computer program products may include element corresponding to the network elements. Similarly, the following example embodiments are directed to a network, but pertain similarly to the computer methods, systems, and computer program products.

In some embodiments, the controller is further configured to adapt the caching and routing decisions based upon an objective function that includes a caching gain. The controller may be centralized at a network management system communicatively coupled to the network nodes and configured to collect a rate of requests of multiple users via at least one of the network nodes. The controller may be further configured to modify the caching gain based on the rate of requests.

In some embodiments, a given node of the network nodes includes a respective controller. The respective controller may be configured to communicate messages to controllers at least at adjacent nodes of the given node. The respective controller may be further configured to adapt the caching and routing decisions as a function of the caching and routing parameters exchanged with one or more controllers at the adjacent nodes.

In some embodiments, the respective controller may be configured to further adapt the caching and routing decisions based on marginal gain of a caching gain that incrementally improves performance of the caching and routing decisions based on the caching and routing parameters.

In some embodiments, a given node of the network nodes may perform a decision used to select a link of a path to the destination node. The link may be between the given node and a node adjacent to the given node. The decision by the given node may be made independently from a decision used to select a respective link by other nodes of the network nodes.

In some embodiments, the controller may be configured to operate at the destination node. The controller may perform the caching and routing decisions to determine a path for delivery of the unit of content to the destination node.

In some embodiments, the destination node is the node at which the user entered the request. In some embodiments, the controller, at the destination node, obtains the caching and routing parameters on an ongoing basis.

In some embodiments, the objective function is based on an assumption that the subset of network nodes includes caches of units or chunks thereof of equal size.

In some embodiments, the controller is further configured to reduce a cost associated with routing of the unit of content along a path to the destination node.

In some embodiments, the controller is further configured to further cause the one or more of the respective nodes to further adapt the caching and routing decisions based on retrieving the caching and routing parameters from given nodes of the network nodes where content associated with caching is located.

In some embodiments, the network nodes are configured to cache the content and to route the unit of content in response to a user request to deliver at least a chunk of the unit of content to the destination node.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 1F illustrates source routing, and FIG. 1G illustrates hop-by-hop routing, according to some embodiments.

DETAILED DESCRIPTION

Figure 1A:
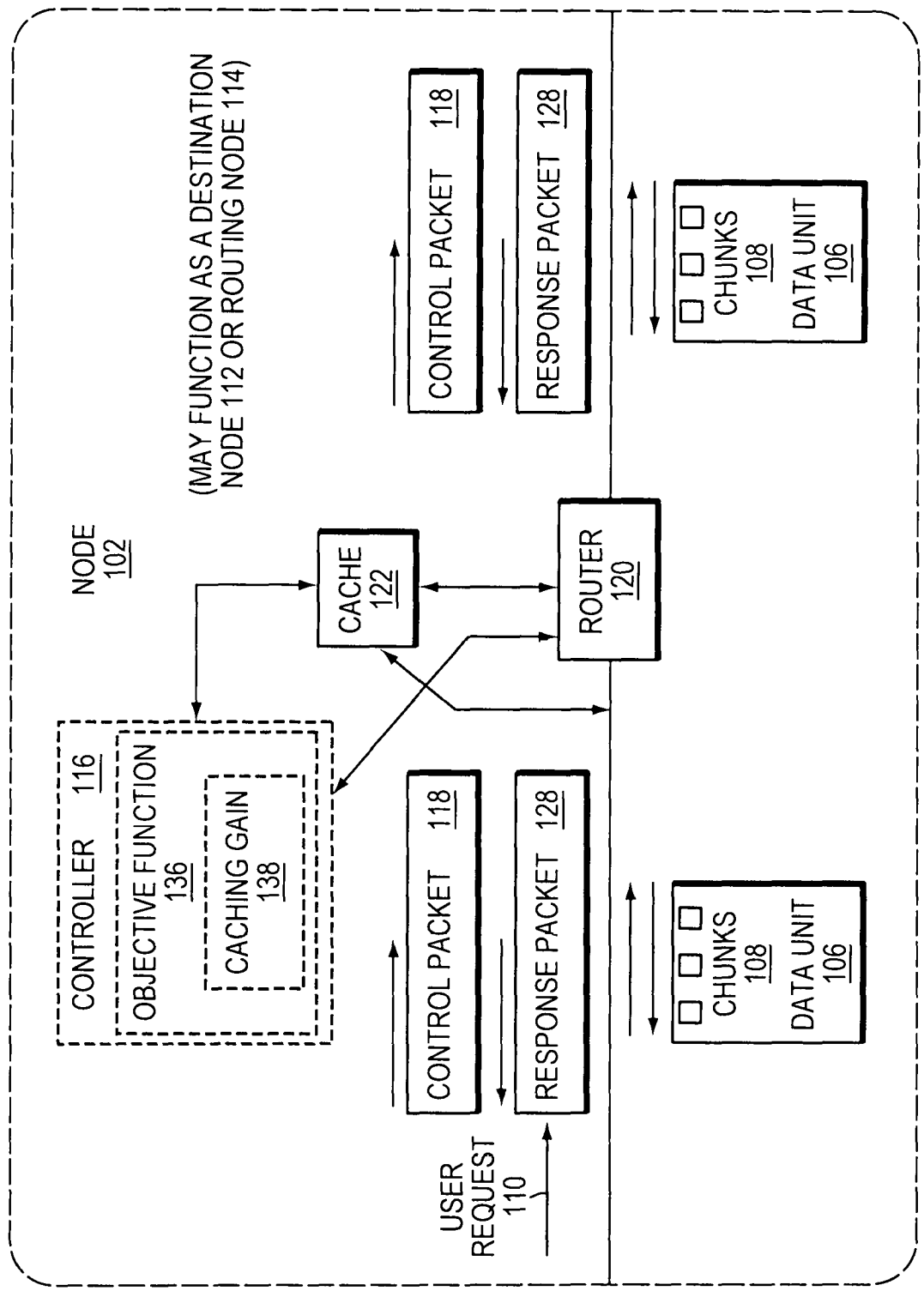
FIG. 1A is a high-level block diagram of routing and caching at a node, according to some embodiments.

A description of example embodiments follows.

The teachings of all patents, published applications and references cited herein are incorporated by reference in their entirety.

Existing approaches to routing have multiple problems. existing approaches are not capable of jointly handling both routing and caching effectively. With regard to routing, using path replication, existing approaches attempt to find content placement that minimizes routing costs. However, with regarding to caching, a central problem is that, even if arriving traffic in a cache is, e.g., Poisson, the outgoing traffic is often hard to describe analytically, even when caches implement simple eviction policies. In existing approaches, the problem of jointly handling routing and caching together is an non-deterministic polynomial time (NP)-hard problem, and therefore challenging to implement with efficient computational complexity.

Embodiments of the present disclosure solve the problems associated with existing approaches. Embodiments provide computer methods, systems, and computer program products for jointly handling routing and caching to deliver content. In stark contrast to existing approaches, embodiments reduce computational complexity and overcome the problem of NP-hard optimization, by application of a convex relaxation.

Embodiments of the present disclosure have multiple advantages compared with existing approaches. As such, according to some embodiments, the networks, computer methods, systems, and computer program products make joint caching and routing decisions. These networks, computer methods, systems, and computer program products are distributed, in that a storage device in the network may make decisions based on packets passing through the storage device. These networks, computer methods, systems, and computer program products are adaptive, in that storage contents may automatically adapt to changes in content demand.

In addition, embodiments are advantageous in that the networks, computer methods, systems, and computer program products herein have provable optimality guarantees, e.g., attaining a cost reduction within a factor ~0.67 (but are not so limited) from the optimal cost reduction attained by existing approaches. These networks, computer methods, systems, and computer program products herein significantly outperform exiting approaches in both caching and routing methods in evaluations over a broad array of network topologies.

Further, embodiments are advantageous in that the networks, computer methods, systems, and computer program products herein include one or more of the following features: (1) jointly determining caching and routing decisions, rather than each separately, (2) having provable guarantees in terms of cost reduction, in contrast to existing approaches, (3) are both distributed and adaptive, and (4) operating using packet information passing through network nodes.

Yet further, embodiments are advantageous in that the networks, computer methods, systems, and computer program products herein can directly find application in a system where content is to be placed in a network with varying demand including but not limited to (i) Content delivery networks, (ii) Information centric networks, (iii) Peer-to-peer networks, and (iv) Cloud computing.

As illustrated collectively in FIGS. 1A-E to follow, embodiments of the present disclosure are directed to networks, computer methods, systems, and computer program products for delivering content. It should be understood that embodiments in the form of computer methods, systems, and computer program products may include element corresponding to the network elements. Similarly, the following example embodiments are directed to a network, but pertain similarly to the computer methods, systems, and computer program products.

FIGS. 1A-E provide a high-level representation of the network nodes, caching and routing. Details of data and control flow are described in more depth in FIGS. 1F-G, FIG. 2, and FIGS. 3A-C to follow.

FIG. 1A is a high-level block diagram of routing 120 and caching 122 at a node 102, according to some embodiments. In some embodiments, a network 100 includes one or more network nodes 102 configured to cache 122 content and to route 120 a unit 106 of content (that may include one or more data chunks 108) in response to a user request 110 to deliver at least the unit 106 of content to a destination node 112 (or routing node 114).

As illustrated in FIG. 1A, a controller 116 may route the unit 106 of content bidirectionally, e.g., in either an upstream or downstream direction. Also as illustrated in FIG. 1A, the user request 110 may be contained in control packet 118 sent to and from the node 102, and a corresponding response packet 128 may be received at the node 102.

The controller 116 may be configured to cause at least a subset of the network nodes 102 to adapt caching and routing decisions. In order to adapt caching and routing decisions, the controller 116 may send or receive one or more messages or signals to or from the cache 122 or router 120. In some embodiments, the cache 122 may perform caching based upon routing information received from the router 120. In some embodiments, the router 120 may perform routing based upon caching information received from the cache 122.

The controller 116 may be configured to cause at least the subset of the network nodes 102 to adapt the caching 122 and routing 120 decisions in a manner that jointly considers caching 122 and routing 120 parameters to deliver at least the unit 106 of content to the destination node 112.

As illustrated in FIG. 1A, the controller 116 may include an objective function 136 that may include a caching gain 138. In some embodiments, the destination node 112 is the node 102 at which the user entered the request 110. In some embodiments, the controller 116, at the destination node 112, obtains the caching and routing parameters on an ongoing basis.

Figure 1B:
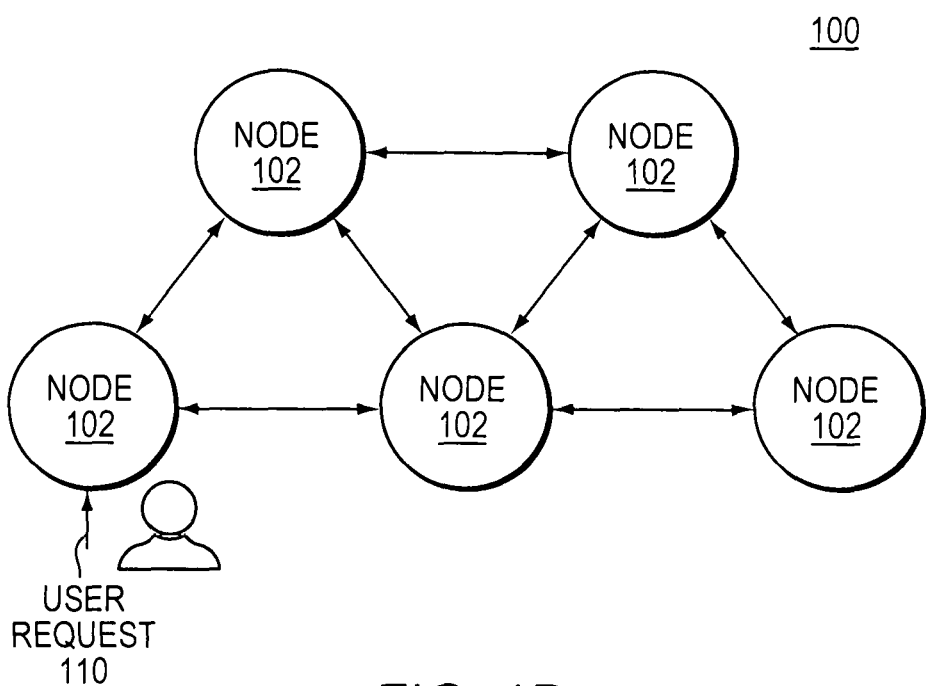
FIG. 1B is a high-level block diagram of routing and caching in a network of the nodes of FIG. 1A, according to some embodiments.

FIG. 1B is a high-level block diagram of routing 120 and caching 122 in a network of the nodes 102 of FIG. 1A, according to some embodiments. In some embodiments, a network 100 includes network nodes 102 configured to cache 122 content and to route 120 a unit 106 of content in response to a user request 110 to deliver at least the unit 106 of content to a destination node 112 (or routing node 114).

The controller 116 may be configured to cause at least a subset of the network nodes 192 to adapt caching 122 and routing 120 decisions. The controller 116 may be configured to cause at least the subset of the network nodes 102 to adapt the caching 122 and routing 120 decisions in a manner that jointly considers caching 122 and routing 120 parameters to deliver at least the unit 106 of content to the destination node 112.

In some embodiments, the destination node 112 is the node 102 at which the user entered the request 110. In some embodiments, the controller 116, at the destination node 112, obtains the caching and routing parameters on an ongoing basis.

Figure 1C:
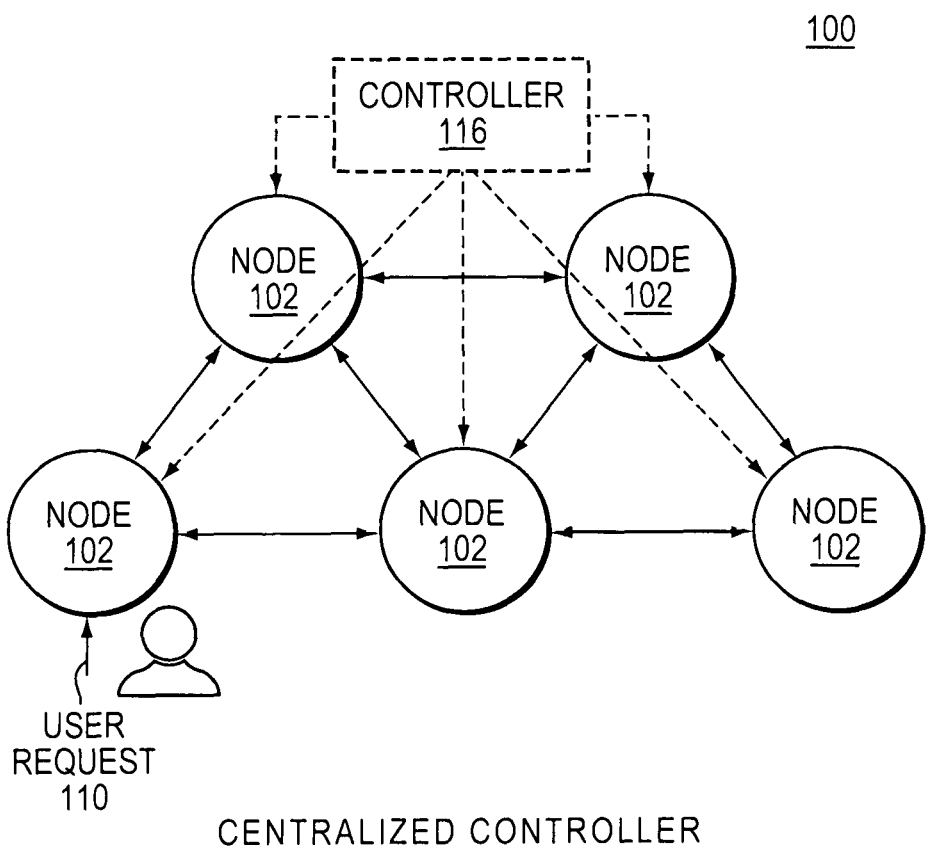
FIG. 1C is a high-level block diagram of routing and caching illustrating centralized control with a controller, in a network of the nodes of FIG. 1A, according to some embodiments.

FIG. 1C is a high-level block diagram of routing 120 and caching 122 illustrating centralized control 130 with a controller 112, in a network of the nodes of FIG. 1A, according to some embodiments.

In some embodiments, the controller is further configured to adapt the caching and routing decisions based upon an objective function 136 that includes a caching gain 138. The controller 112 may be centralized at a network management system communicatively coupled to the network nodes 102 and configured to collect a rate of requests 110 of multiple users via at least one of the network nodes 102. The controller 116 may be further configured to modify the caching gain 138 based on the rate of requests 110.

In some embodiments, the objective function 136 is based on an assumption that the subset of network nodes includes caches of units 106 or chunks 108 thereof of equal size.

Figure 1D:
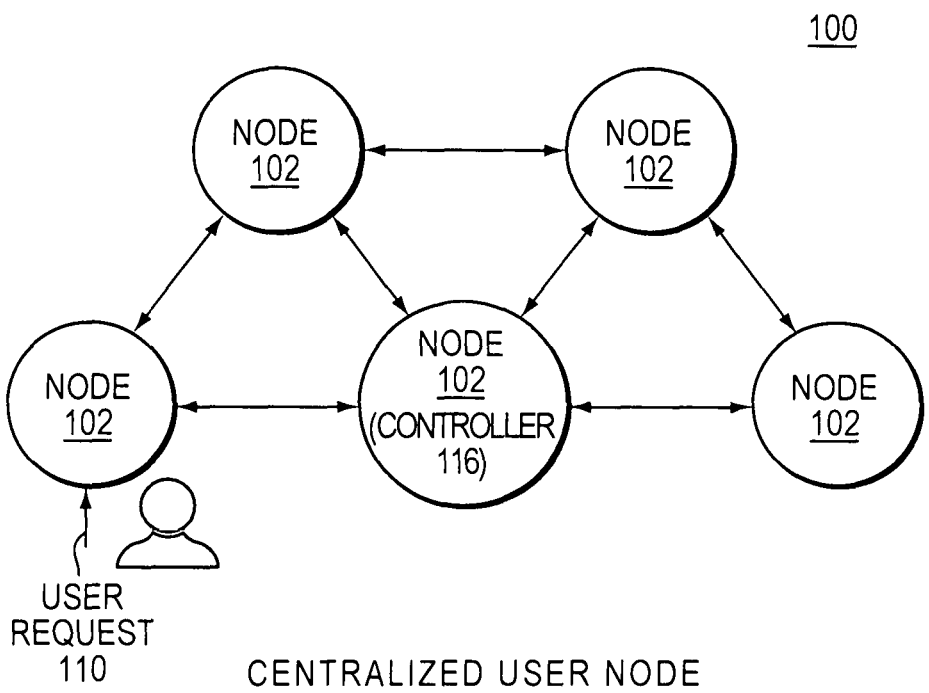
FIG. 1D is a high-level block diagram of routing and caching illustrating centralized control at a user node, in a network of the nodes of FIG. 1A, according to some embodiments.

FIG. 1D is a high-level block diagram of routing and caching illustrating centralized control at a user node, in a network of the nodes of FIG. 1A, according to some embodiments.

In some embodiments, the controller 116 may be configured to operate at the destination node 112. The controller 116 may perform the caching 122 and routing 120 decisions to determine a path for delivery of the unit of content to the destination node 112.

In some embodiments, the controller 116 is further configured to reduce a cost associated with routing of the unit of content along a path to the destination node 112.

Figure 1E:
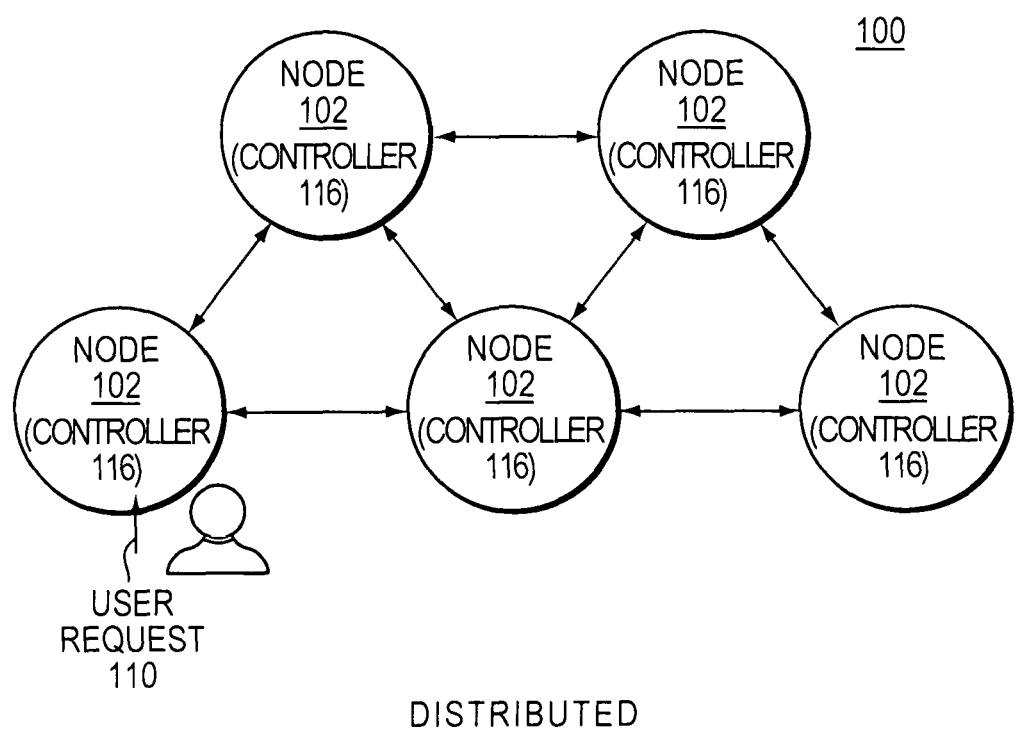
FIG. 1E is a high-level block diagram of routing and caching illustrating distributed control, in a network of the nodes of FIG. 1A, according to some embodiments.

FIG. 1E is a high-level block diagram of routing and caching illustrating distributed control, in a network of the nodes of FIG. 1A, according to some embodiments.

In some embodiments, a given node of the network nodes includes a respective controller. The respective controller may be configured to communicate messages to controllers at least at adjacent nodes of the given node. The respective controller may be further configured to adapt the caching and routing decisions as a function of the caching and routing parameters exchanged with one or more controllers at the adjacent nodes.

In some embodiments, the respective controller may be configured to further adapt the caching and routing decisions based on marginal gain of a caching gain that incrementally improves performance of the caching and routing decisions based on the caching and routing parameters.

In some embodiments, a given node of the network nodes 102 may perform a decision used to select a link of a path to the destination node 112. The link may be between the given node 102 and a node adjacent to the given node. The decision by the given node 102 may be made independently from a decision used to select a respective link by other nodes of the network nodes.

As illustrated in FIGS. 1A-E, in some embodiments, the controller 116 may be further configured to further cause the one or more of the respective nodes 102 to further adapt the caching and routing decisions based on retrieving the caching and routing parameters from given nodes of the network nodes 102 where content associated with caching is located. In some embodiments, the network nodes 102 are configured to cache the content and to route the unit of content in response to a user request to deliver at least a chunk 108 of the unit 106 of content to the destination node.

I. Introduction

Storing content in a network to serve download requests is a problem as old as the Internet itself, arising in information-centric networks (ICNs) [2], [3], content-delivery networks (CDNs) [4], [5], web-cache design [6][8], wireless/femtocell networks [9][11], and peer-to-peer networks [12], [13]. A caching network is a network of nodes augmented with additional caching capabilities. In such a network, some nodes act as designated content servers, permanently storing content and serving as "caches of last resort." Other nodes route requests towards these designated servers. If an intermediate node in the route towards a server caches the requested content, the request is satisfied early, and a copy of the content follows the reverse path towards the request's source.

Embodiments herein work in conjunction with the above-mentioned applications. For example, in the case of ICNs, designated servers correspond to traditional web servers permanently storing content, while nodes generating requests correspond to customerfacing gateways. Intermediate, cache-enabled nodes correspond to storage-augmented routers in the Internet's backbone: such routers forward requests but, departing from traditional network-layer protocols, immediately serve requests for content they store. An extensive body of research, both theoretical [7], [14][20] and experimental [2], [6][8], [21], has focused on modeling and analyzing caching networks in which routing is fixed: a request follows a predetermined route, e.g., the shortest path to the nearest designated server. Given routes to be followed and the demand for items, the above works determine (theoretically or empirically) the behavior of different caching methods deployed over intermediate nodes.

According to some embodiments, it is not a priori clear whether fixed routing and, more specifically, routing towards the nearest server is a justified design choice. This is of special interest in the context of ICNs, where delegating routing decisions to another protocol amounts to an "incremental" ICN deployment. For example, in such a deployment, requests can be routed towards the nearest designated server according to existing routing protocols such as Open Shortest Path First (OSPF) or Border Gateway Protocol (BGP) [22]. An alternative is to jointly optimize both routing and caching decisions simultaneously, redesigning both caching and routing protocols. This poses a significant challenge as joint optimization is inherently combinatorial: indeed, jointly optimizing routing and caching decisions with the objective of, e.g., minimizing routing costs, is an NP-hard problem, and constructing a distributed approximation method is far from trivial [9], [20], [23], [24]. This state of affairs gives rise to the following questions. First, is it possible to design distributed, adaptive, and tractable methods jointly optimizing both routing and caching decisions over arbitrary cache network topologies, with provable performance guarantees? Second, presuming such methods exist, do they yield significant performance improvements over fixed routing protocols? Answering this question in the affirmative may justify the potential increase in protocol complexity due to joint optimization, and can also inform future ICN design, settling whether an incremental approach (in which routing and caching are separate) suffices. One goal herein is to provide rigorous, comprehensive answers to these two questions. Embodiments make the following contributions:

By constructing a counterexample, some embodiments show that fixed routing (and, in particular, routing towards the nearest server) can be arbitrarily suboptimal compared to jointly optimizing caching and routing decisions. Intuitively, joint optimization affects routing costs drastically because exploiting path diversity increases caching opportunities.

Some embodiments include a formal mathematical framework for joint routing and caching optimization. Some embodiments consider both source routing and hop-by-hop routing strategies, the two predominant classes of routing protocols over the Internet [22].

Some embodiments address the offline version of the joint routing and caching optimization problem, which is NP-hard, and construct a polynomial-time 1-1/e approximation method. Some embodiments first relax the integral problem to a convex optimization problem. The resulting solution is subsequently rounded to produce an integral solution.

Some embodiments provide a distributed, adaptive method that converges to joint routing and caching strategies that are, globally, within a 1–1/e approximation ratio from the optimal. According to some embodiments, distributed implementation amounts to a projected gradient ascent (PGA) over the convex relaxation used in some embodiments while offline, coupled with a randomized rounding technique.

Some embodiments are evaluated over 9 synthetic and 3 real-life network topologies, and significantly outperform the state of the art: reducing routing costs by a factor between 10 and 1000, for a broad array of competitors, including both fixed and dynamic routing protocols.

Section II herein provides review of related work. Section III presents a mathematical model of a caching network, according to some embodiments. The suboptimality of fixed routing is shown in Section IV, while embodiments may be offline and online and are presented in Sections V and VI, respectively, under source routing. Extensions to hop-by-hop routing are discussed in Section VII. According to some embodiments, a numerical evaluation over several topologies is presented in Section VIII. Section IX provides a conclusion.

II. Related Work Section

There is a vast literature on individual caches, serving as fast secondary memory devices, and the topic is classic (see, e.g., [25][27]). Nevertheless, the study of networks of caches still poses significant challenges. A central problem is that, even if arriving traffic in a cache is, e.g., Poisson, the outgoing traffic is often hard to describe analytically, even when caches implement simple eviction policies. This is true for several traditional eviction policies, like Least Recently Used (LRU), Least Frequently Used (LFU), First In First Out (FIFO), and Random Replacement (RR). The Che approximation [7], [14], a significant breaktrough, approximates the hit rate under several eviction policies by assuming constant occupancy times. This approximation is accurate in practice [14], and its success has motivated extensive research in so-called timeto-live (TTL) caches. A series of recent works have focused on identifying how to set TTLs to (a) approximate the behavior of known eviction policies, (b) describe hit-rates in closed-form formulas [7], [15][17], [28]. Despite these advances, none of the above works address issues of routing cost minimization over multiple hops, which is a goal of some embodiments.

A simple, elegant, and ubiquitous method for populating caches under fixed routing is path replication [12], sometimes also referred to as "leave-copy-everywhere" (LCE) [6]: once a cache hit occurs, every downstream node receiving the response caches the content, while eviction happen via LRU, LFU, FIFO, and other traditional policies. Several variants exist: in "leave-copy-down" (LCD), a copy is placed only in the node immediately preceding the cache where the hit occurred [6], [29], while "move-copy-down" (MCD) also removes the present upstream copy. Probabilistic variants have also been proposed [30]. Several works [6], [21], [30][32] experimentally study these variants over a broad array of topologies. Despite the simplicity and elegance inherent in path replication, when targeting an optimization objective such as, e.g., minimizing total routing costs, the above variants, combined with traditional eviction policies, are known to be arbitrarily suboptimal [20].

In their seminal paper [12] introducing path replication, Cohen and Shenker also introduced the problem of finding a content placement that minimizes routing costs. The authors show that path replication combined with a constant rate of evictions leads to an allocation that is optimal, in equilibrium, when nodes are visited through uniform sampling. Unfortunately, optimality breaks down when uniform sampling is replaced by routing over graph topologies [20]. Several papers have studied the offline cost minimization under restricted topologies [9], [23], [24], [33][35]. With the exception of [9], these works model the network as a bipartite graph: nodes generating requests connect directly to caches in a single hop, and methods do not readily generalize to arbitrary topologies. In general, the pipage rounding technique of Ageev and Sviridenko [36] yields again a constant approximation method in the bipartite setting, while approximation methods are also known for several variants of this problem [23], [24], [33], [34]. Excluding [24], these works focus on centralized solutions of the offline caching problem; none considers jointly optimizing caching and routing decisions.

Joint caching and routing has been studied in restricted settings. The benefit of routing towards nearest replicas, rather than towards nearest designated servers, has been observed empirically [37][39]. Deghan et al. [5], Abedini and Shakkotai [40], and Xie et al. [41] study joint routing and content placement methods in a bipartite, single-hop setting. In all cases, minimizing the single-hop routing cost reduces to solving a linear program; Naveen et al. [10] extend this to other, non-linear (but still convex) objectives of the hit rate, still under single-hop, bipartite routing constraints. None of these approaches generalize to a multi-hop setting, which leads to non-convex formulations (see Section III-F); addressing this lack of convexity is a technical contribution of some embodiments herein. A multi-hop, multi-path setting is formally analyzed by Carofiglio et al. [39] under restricted arrival rates, assuming that requests by different users follow non-overlapping paths. Some embodiments address the problem in its full generality, for arbitrary topologies, arrival rates, and overlapping paths. When routes are fixed, and caching decisions are optimized, maximizing the caching gain amounts to maximizing a submodular function subject to matroid constraints [9], [20]. Problems with structure appear in many important applications related to combinatorial optimization [42] [46]; for an overview of the topic, see Krause and Golovin [47]. Though generic submodular maximization subject to matroid constraints is NP-hard, several known approximation methods exist in the so-called value oracle model (i.e., assuming access to a poly-time oracle that evaluates the submodular objective). Nemhauser et al. [43] show that the greedy method produces a solution within ½ of the optimal. Vondrak [44] and Calinescu et al. [45], [46] show that the continuous-greedy method produces a solution within $(1-1/e)$ of the optimal in polynomial time, which cannot be further improved [48]. Under the value oracle model, the continuous-greedy method requires random sampling to estimate the gradient the specific objective of maximizing the caching gain under fixed routing, the concave relaxation technique of Ageev and Sviridenko [36] attains the $1-1/e$ approximation ratio while eschewing sampling; this is shown in [9] for homogeneous caches and a specific class of topologies, and generalized to heterogeneous caches and arbitrary topologies in [20].

Jointly optimizing routing and caching decisions is not a submodular maximization problem subject to matroid constraints. Nevertheless, an embodiment shows that that a variant the technique by Ageev and Sviridenko [36] can be used to obtain a polytime approximation method, that also lends itself to a distributed, adaptive implementation. An embodiment shows this by extending [20] to incorporate routing decisions, both through source and hop-by-hop routing. Crucially, evaluations in Section VIII show that jointly optimizing caching and routing, according to some embodiments, significantly improves performance compared to fixed routing, reducing the routing costs of [20] by as much as three orders of magnitude.

III. Model

Embodiments include a formal model, extending [20] to account for both caching and routing decisions. Some embodiments apply to two routing variants: (a) source routing and (b) hop-by-hop routing.

Figure 1F:
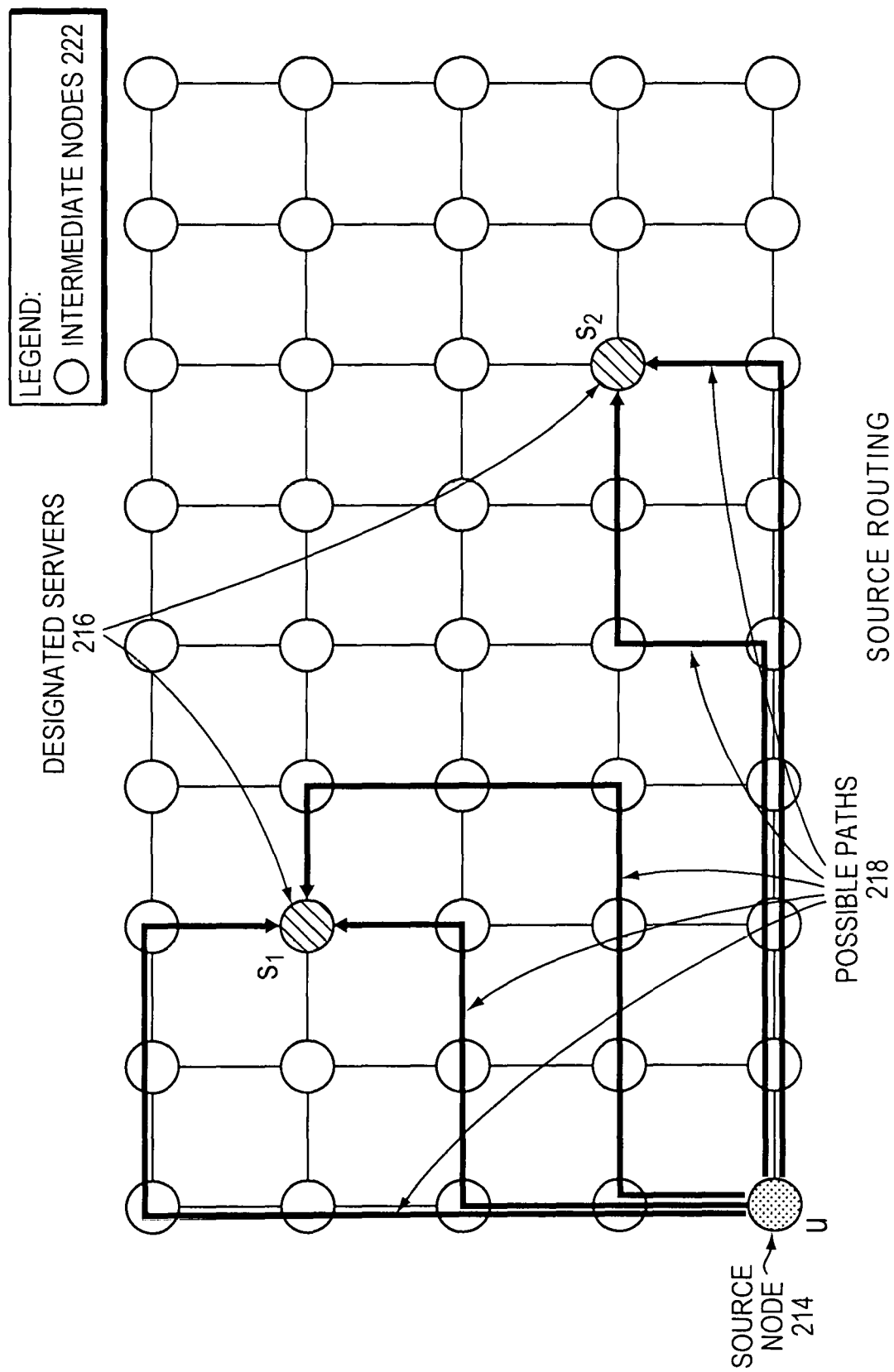
FIGS. 1F-G collectively illustrate source routing versus hop-by-hop routing, according to some embodiments.
Figure 1G:
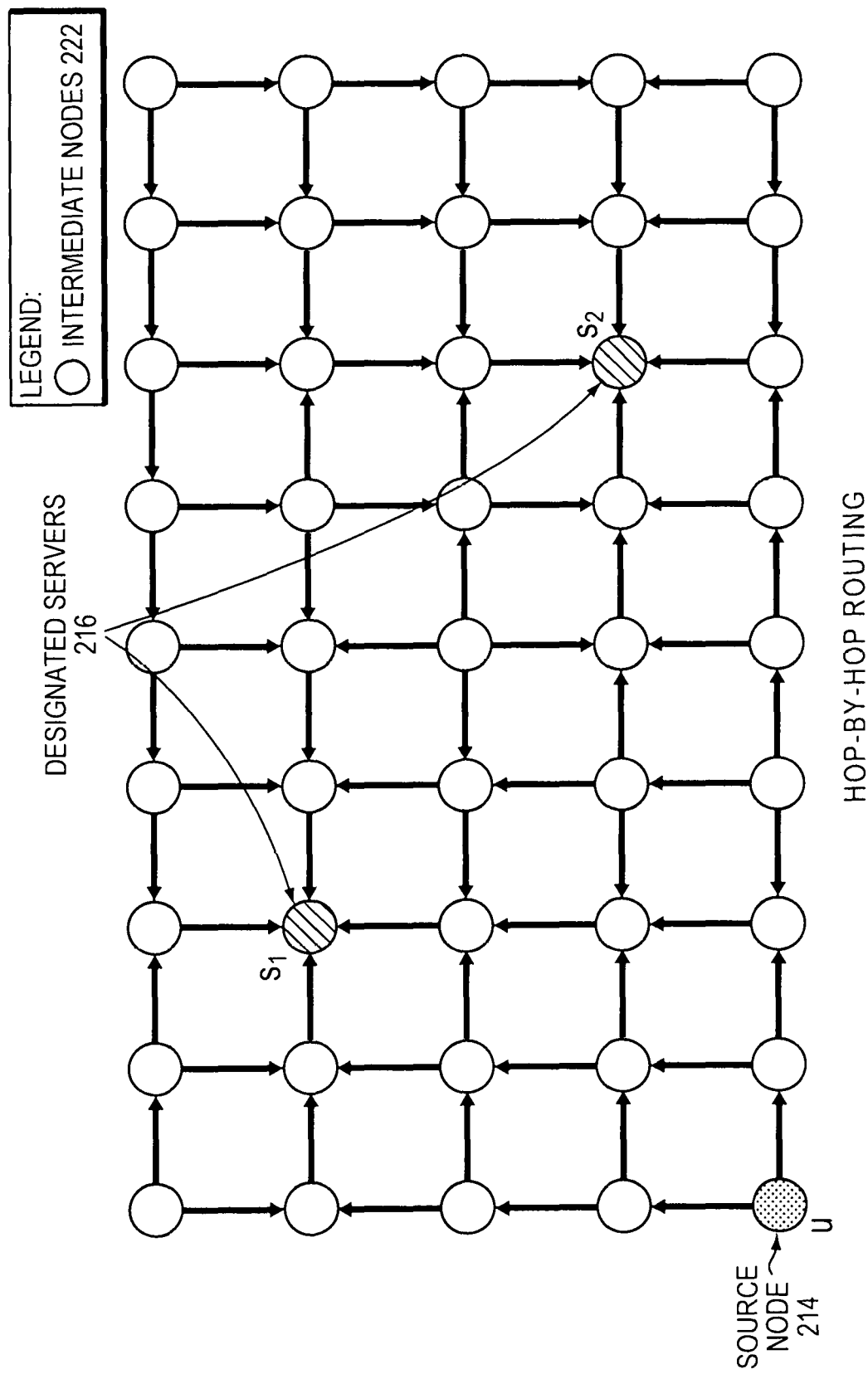

FIGS. 1F-G collectively illustrate source routing 212 (in FIG. 1F) versus hop-by-hop routing 220 (in FIG. 1G), according to some embodiments.

As illustrated in FIG. 1F, in source routing 212, shown left of source node u (element 214) on the bottom left can choose among 5 possible paths 218 to route a request to one of the designated servers 216 storing i ($s_1$, $s_2$). As illustrated in FIG. 1G, in hop-by-hop routing 220, each intermediate node 222 selects the next hop among one of its neighbors in a DAG whose sinks are the designated servers 216.

In both cases of (a) source routing 212 and (b) hop-by-hop routing 220, some embodiments include two types of strategies: deterministic and randomized. For example, in source routing, requests for an item originating from the same source may be forwarded over several possible paths, given as input. In deterministic source routing, only one is selected and used for subsequent requests with this origin. In contrast, a randomized strategy samples a new path to follow independently with each new request. Some embodiments also use similar deterministic and randomized analogues both for caching strategies as well as for hop-by-hop routing strategies.

Randomized strategies subsume deterministic ones, and are arguably more flexible and general. This begs the question: why study both? There are three reasons. First, optimizing deterministic strategies naturally relates to combinatorial techniques such as [36], which embodiments can leverage to solve the offline problem. Second, the online, distributed methods are included in some embodiments to construct randomized strategies mirror the solution to the offline, deterministic problem: they leverage the same convex relaxation. In addition: deterministic strategies turn out to be equivalent to randomized strategies. As an embodiment shows in Theorem [3] ("Theorem" being abbreviated as "Theorem" herein), the smallest routing cost attained by randomized strategies is the same as the one attained by deterministic strategies.

A. Network Model and Content Requests

Consider a network represented as a directed, symmetric [2] graph G(V,E). Content items (e.g., files, or file chunks) of equal size are to be distributed across network nodes. Each node is associated with a cache that can store a finite number of items. Some embodiments denote by C the set of possible content items, i.e., the catalog, and by $c_v \in \mathbb{N}$ the cache capacity at node $v \in V$: exactly $c_v$ content items can be stored in v. The network serves content requests routed over the graph G. A request (i,s) is determined by (a) the item $i \in C$ requested, and (b) the source $s \in V$ of the request. Some embodiments denote by $\mathcal{R} \subseteq C \times V$ the set of all requests. Requests of different types $(i,s) \in \mathcal{R}$ arrive according to independent Poisson processes with arrival rates $\lambda_{(i,s)} > 0$, $(i,s) \in \mathcal{R}$.

For each item $i \in C$ there is a fixed set of designated server nodes $S_i \subseteq V$, that always store i. A node $v \in S_i$ permanently stores i in excess memory outside its cache. Thus, the placement of items to designated servers is fixed and outside the network's design. A request (i,s) is routed over a path in G towards a designated server. However, forwarding terminates upon reaching any intermediate cache that stores i. At that point, a response carrying i is sent over the reverse path, i.e., from the node where the cache hit occurred, back to source node s. Both caching and routing decisions are network design parameters, which some embodiments define formally below in the Table I—Notation Summary.

TABLE 1

NOTATION SUMMARY

| | Common Notation |
|---|---|
| G(V, E) | Network graph, with nodes V and Edges E |
| C | Item catalog |
| $C_v$ | Cache capacity at node $v \in V$ |
| $W_{uv}$ | Weight of edge $(u, v) \in E$ |
| R | Set of requests (i, s), with $i \in C$ and source $s \in V$ |
| $\lambda_{(i,s)}$ | Arrival rate of requests $(i, s) \in R$ |
| $S_i$ | Set of designated servers of $i \in C$ |
| $x_{vi}$ | Variable indicating whether $v \in V$ stores $i \in C$ |
| $\xi_{vi}$ | Global catching strategy of $x_{vi}$s, in $\{0, 1\}^{|V| \times |C|}$ |
| $\Xi$ | Expectation of caching strategy matrix X |

TABLE 1-continued

NOTATION SUMMARY

| | |
|---|---|
| T | Duration of a timeslot in online setting |
| $W_{uv}$ | Weight/cost of edge (u, v) |
| supp(·) | Support of probability distribution |
| conv(·) | Convex hull of a set |
| | Source Routing |
| $P_{(i,s)}$ | Set of paths requested (i, s) ∈ R can follow |
| $P_{SR}$ | Total number of paths |
| p | A simple path of G |
| $k_p(v)$ | The position of node v ∈ p in p. |
| $r_{(i,s),p}$ | Variable indicating whether (i, s) ∈ R is forwarded over p ∈ $P_{(i,s)}$ |
| $p^{(i,s),p}$ | Marginal probability that s routes request for i over p |
| r | Routing strategy of $r_{(i,s)}$, $p^s$, in $\{0, 1\}^{\Sigma_{(i,s)\in R}|P_{(i,s)}|}$. |
| P | Expectation of routing strategy vector r |
| $D_{SR}$ | Feasible strategies (r, X) of MAXCG-S |
| RNS | Route to nearest server |
| RNR | Route to nearest Replica |
| | Hop-by-Hop Routing |
| $G^{(i)}$ | DAG with sinks in $S_i$ |
| $E^{(i)}$ | Edges in DAG $G^{(i)}$ |
| $G^{(i,s)}$ | Subgraph of $G^{(i)}$ including only nodes reachable from s |
| $P_{HH}$ | Set of paths in $G^{(i,s)}$ from s to u |
| $P^u_{(i,s)}$ | Total number of paths |
| $R^{(i)}_{u,v}$ | Variable indicating whether u forwards a request for i to v |
| $P_{uv}$ | Marginal probability that u forwards a request for i to v |
| r | Routing strategy of $r^i_{u,v}$,s, in $\{0, 1\}^{\Sigma_{i\in C}|E^{(i)}|}$. |
| P | Expectation of routing strategy vector r |
| $D_{HH}$ | Feasible strategies (r, X) of MAXCG-HH |

B. Caching Strategies

Some embodiments include both deterministic and randomized caches. Deterministic caches. For each node v∈V, some embodiments define v's caching strategy as a vector x $v \in \{0, 1\}^{|C|}$, where $x_{v,i} \in \{0, 1\}$, for i∈C, is the binary variable indicating whether v stores content item i. As v can store no more than $c_v$ items:

$$\Sigma_{i\in C} x_{v,i} \leq c_v, \text{ for all } v\in V. \quad (1)$$

The global caching strategy is the matrix $X = [x_{v,i}]_{v\in V, i\in C} \in \{0, 1\}^{|V|\times|C|}$, whose rows comprise the caching strategies of each node.

Randomized Caches.

In randomized caches, the caching strategies $x_v$, v∈V, are random variables. Some embodiments denote by:

$$\xi_{v,i}=P[x_{v,i}=1]=\mathbb{E}[x_{v,i}]\in[0,1], \text{ for } i\in C, \quad (2)$$

the marginal probability that node v caches item i, and by $\Xi=[\xi_{v,i}]_{v\in V, i\in C}=\mathbb{E}[X]\in[0,1]^{|V|\times|C|}$, the corresponding expectation of the global caching strategy.

C. Source Routing Strategies

Recall that requests are routed towards designated server nodes. In source routing, for every request (i,s)∈C×V, there exists a set $\mathcal{P}_{(i,s)}$ of paths that the request can follow towards a designated server in $\mathcal{S}_i$. A source node s can forward a request among any of these paths, but some embodiments assume each response follows the same path as its corresponding request. Formally, a path p of length |p|=K is a sequence $\{p_1, p_2, \ldots, p_K\}$ of nodes $p_k \in V$ such that $(p_k, p_{k+1})\in E$, for every k∈{1, ..., |p|−1}. Some embodiments include the following natural assumptions on the set of paths $\mathcal{P}(i,s)$. For every $p\in\mathcal{P}_{(i,s)}$:

(a) p starts at s, i.e., $p_1$=s;
(b) p is simple, i.e., it contains no loops;
(c) the last node in p is a designated server for item i, i.e., if |p|=K, $p_K \in S_i$; and
(d) no other node in p is a designated server for item i, i.e., if |p|=K, $p_k \neq S_i$, for k=1, ..., K−1.

These properties imply that a request routed over a path $p\in\mathcal{P}$ $\mathcal{P}_{(i,s)}$ is always satisfied as, in the worst case, an item is retrieved at the terminal designated server. Given a path p and a v∈p, some embodiments denote by $k_p(v)$ the position of v in p; i.e., $k_p(v)$ equals to k∈{1, ..., |p|} such that $p_k$=v.

Deterministic Routing.

Given sets $\mathcal{P}_{(i,s)}$, (i,s)∈$\mathcal{R}$, the routing strategy of a source s∈V with respect to ("with respect to" being abbreviated as "w.r.t." herein) request (i,s)∈$\mathcal{R}$ is a vector $r_{(i,s)} \in \{0,1\}^{|\mathcal{P}^{(i,s)}|}$, where $r_{(i,s),p} \in \{0,1\}$ is a binary variable indicating whether s selected path $p\in\mathcal{P}_{(i,s)}$.

These satisfy:

$$\sum_{p\in\mathcal{P}_{(i,s)}} r_{(i,s),p} = 1, \text{ for all } (i, s) \in \mathcal{R}, \quad (3)$$

indicating that exactly one path is selected. Let $\mathcal{P}_{SR} = \Sigma_{(i,s)\in\mathcal{R}}|\mathcal{P}_{(i,s)}|$ be the total number of paths. Some embodiments refer to the PSR vector $r=[r_{(i,s), p}]_{(i,s)\in R, p\in P(i,s)} \in \{0, 1\}^{P_{SR}}$, as the global routing strategy.

Randomized Routing.

In randomized routing, variables $r_{(i,s)}$, (i,s)∈$\mathcal{R}$ are random. that is, some embodiments randomize routing by allowing requests to be routed over a random path in $\mathcal{P}_{(i,s)}$, selected independently of all past routing decisions (at s or elsewhere). Some embodiments denote by $$\rho_{(i,s),p}=P[r_{(i,s),p}=1]=\mathbb{E}[r_{(i,s),p}], \text{ for } p\in\mathcal{P}_{(i,s)}, \quad (4)$$

the probability that path p is selected by s, and by $\rho = [\rho_{(i,s), p}](i,s)\in\mathcal{R}, p\in\mathcal{P}_{(i,s)}=\mathbb{E}[r]\in[0,1]^{P_{SR}}$ the expectation of the global routing strategy r.

Remark.

Some embodiments include no a priori assumptions on $P_{SR}$, the total number of paths used during source routing. The complexity of the offline method, and the rate of convergence of some embodiments distributed, adaptive method depend on $P_{SR}$ (see Lemma [5]). In practice, if the number of possible paths is, e.g., exponential in |V|, it makes sense to restrict each $\mathcal{P}_{(i,s)}$ to a small subset of possible paths, or to use hop-by-hop routing instead. As discussed below, the later restricts the maximum number of paths considered.

As some embodiments treat path sets $\mathcal{P}_{(i,s)}$ as inputs, the methods and performance guarantees apply irrespectively of how these paths are constructed or selected. That said, there exist both centralized and distributed methods for constucting such multipath alternatives, such as k-shortest path methods [49], [50], equal cost multipath routing (ECMP) [51], [52], and multipath distance vector routing [53], [54]. All of these include inherent caps on the multiplicity of alternative paths discovered, and can thus be used to construct a input instance to the problem whose PSR is polynomial in the number of nodes.

D. Hop-by-Hop Routing Strategies

Under hop-by-hop routing, each node along the path makes an individual decision on where to route a request message. When a request for item i arrives at an intermediate node v∈V, node v determines how to forward the request to one of its neighbors. The decision depends on i but not on the request's source. This limits the paths a request may follow, making hop-by-hop routing less expressive than source routing. On the other hand, reducing the space of routing strategies reduces complexity. In adaptive methods, it also speeds up convergence, as routing decisions w.r.t. i are "learned" across requests by different sources.

To ensure loop-freedom, some embodiments assume that forwarding decisions are restricted to a subset of possible neighbors in G. For each i∈C, some embodiments denote by $G^{(i)}(V, E^{(i)})$ a graph that has the following properties:

(a) $G^{(i)}$ is a subgraph of G, i.e., $E^{(i)} \subseteq E$;
(b) $G^{(i)}$ is a directed acyclic graph (DAG); and
(c) a node v in $G^{(i)}$ is a sink if and only if it is a designated server for i, i.e., $v \in S_i$.

Some embodiments assume that every node v∈V can forward a request for item i only to a neighbor in $G^{(i)}$. Then, the above properties of $G^{(i)}$ ensure both loop freedom and successful termination.

Deterministic Routing.

For any node s∈V, let $G^{(i,s)}$ be the induced subgraph of $G^{(i)}$ which results from removing any nodes in $G^{(i)}$ not reachable from s. For any u in G(i,s), let $\mathcal{P}^u_{(i,s)}$ be the set of all paths in $G_{(i,s)}$ from s to u, and denote the total number of paths by $$P_{HH} = \sum_{(i,s) \in C} \sum_{u \in V} |\mathcal{P}^u_{(i,s)}|.$$

Some embodiments denote by $r_{uv}^{(i)} \in \{0,1\}$, for $(u,v) \in E^{(i)}$, i∈C, the decision variable indicating whether u forwards a request for i to v. The global routing strategy is $$r = [r_{uv}^{(i)}] i \in C, (u,v) \in E^{(i)} \in \{0, 1\}^{\sum_{i \in C} |E^{(i)}|}$$

and satisfies $$\sum_{v:(u,v) \in E^{(i)}} r_{uv}^{(i)} = 1, \text{ for all } v \in V, i \in C. \quad (5)$$

Note that, in contrast to source routing strategies, that have length $P_{SR}$, hop-by-hop routing strategies have length at most $|C||E|$.

Randomized Routing.

As in source routing, some embodiments also consider randomized hop-by-hop routing strategies, whereby each request is forwarded independently from previous routing decisions to one of the possible neighbors. Some embodiments again denote by $$\rho = [\rho_{uv}^{(i)}]_{i \in C, (u,v) \in E^{(i)}} = [\mathbb{E}[r_{uv}^{(i)}]]_{i \in C, (u,v) \in E^{(i)}} \quad (6)$$
$$= [P[r_{uv}^{(i)} = 1]]_{i \in C, (u,v) \in E^{(i)}} \in [0, 1]^{\sum_{i \in C} |E^{(i)}|},$$

the vector of corresponding (marginal) probabilities of routing decisions at each node v.

Remark.

Given G and $S_i$, $G^{(i)}$ can be constructed in polynomial time using, e.g., the Bellman-Ford method [55]. Indeed, requiring that v forwards requests for i∈C only towards neighbors with a smaller distance to a designated server in $S_i$ results in such a DAG. A distance-vector protocol [22] can form this DAG in a distributed fashion. This may be executed once, before any subsequent caching and routing optimization methods are executed. Other constructions are also possible. For example, one could determine a potential function for each node, where $S_i$ has zero potential, and considering edges that decrease the potential. The proposed methods work for arbitrary DAGs, irrespectively of how they are produced (i.e., even if the potential function is not the distance to $S_i$), though it may be preferable to, e.g., take into account edge weights when computing distances, which some embodiments introduce below in Section III-F ("Section" is abbreviated as "Sec." herein). That said, once DAGs $G^{(i)}$ have been constructed, The methods can be executed with these as inputs.

E. Offline Vs. Online Setting

To reason about the caching networks, some embodiments include one or more of two settings: the offline and online setting. In the offline setting, problem inputs (demands, network topology, cache capacities, etc.) are known apriori to, e.g., a system designer. At time t=0, the system designer selects (a) a caching strategy X, and (b) a routing strategy r. Both can be either deterministic or randomized, but both are also static: they do not change as time progresses. In the case of caching, cache contents (selected deterministically or at random at t=0) remain fixed for all t≥0. In the case of routing decisions, the distribution over paths (in source routing) or neighbors (in hop-by-hop routing) remains static, but each request is routed independently of previous requests.

In the online setting, no a priori knowledge of the demand, i.e., the rates of requests $\lambda_{(i,s)}$, $(i,s) \in \mathcal{R}$ is assumed. Both caching and routing strategies change through time via a distributed, adaptive method. Time is slotted, and each slot has duration T>0. During a timeslot, both caching and routing strategies remain fixed. Nodes have access only to local information: they are aware of their graph neighborhood and state information they maintain locally. They exchange messages, including both normal request and response traffic, as well as (possibly) control messages, and may adapt their state. At the conclusion of a time slot, each node changes its caching and routing strategies. Changes made by v may depend on its neighborhood, its current local state, as well as on messages that node v received in the previous timeslot. Both caching and routing strategies during a timeslot may be deterministic or randomized. Note that implementing a caching strategy at the conclusion of a timeslot involves changing cache contents, which incurs additional overhead; if T is large, however, this cost is negligible compared to the cost of transferring items during a timeslot.

F. Optimal Routing and Caching

Some embodiments herein solve the problem of jointly optimizing routing and caching. Some embodiments pose here the offline problem in which problem inputs are given; nevertheless, some embodiments devise distributed, adaptive methods that do not a priori know the demand in Section VI.

To capture costs (e.g., latency, money, etc.), some embodiments associate a weight $w_{uv} \geq 0$ with each edge $(u,v) \in E$, representing the cost of transferring an item across this edge. Some embodiments assume that costs are solely due to response messages that carry an item, while request-forwarding costs are negligible. Some embodiments do not assume that $w_{uv} = w_{vu}$. Some embodiments describe the cost minimization objectives under source and hop-by-hop routing below.

Source Routing.

The cost of serving a request $(i,s) \in \mathcal{R}$ under source routing is:

$$C_{SR}^{(i,s)}(r, X) = \sum_{p \in \mathcal{P}_{(i,s)}} r_{(i,s),p} \sum_{k=1}^{|p|-1} w_{p_{k+1} p_k} \prod_{k'=1}^{k} (1 - x_{p_{k'},i}). \quad (7)$$

Intuitively, (7) states that $C_{SR}^{(i,s)}$ includes the cost of an edge $(p_k+1, p_k)$ in the path p if (a) p is selected by the routing strategy, and (b) no cache preceding this edge in p stores i. In the deterministic setting, some embodiments seek a global caching and routing strategy (r,X) minimizing the aggregate expected cost, defined as:

$$C_{SR}(r, X) = \sum_{(i,s) \in \mathcal{R}} \lambda_{(i,s)} C_{SR}^{(i,s)}(r, X), \quad (8)$$

with $C_{SR}^{(i,s)}$ given by (7). That is, some embodiments solve:

MINCOST-SR

Minimize $C_{SR}(r, X)$ (9a)

subj. to: $(r, X) \in \mathcal{D}_{SR}$ (9b)

where $\mathcal{D}_{SR} \subset \mathcal{R}^{P_{SR}} \times \mathcal{R}^{|V| \times |C|}$ is the set of (r;X) satisfying the routing, capacity, and integrality constraints, i.e.:

$$\Sigma_{i \in C} x_{v,i} = c_v, \forall v \in V, \quad (10a)$$

$$\Sigma_{p \in \mathcal{P}_{(i,s)}} r_{(i,s),p} = 1, \forall (i,s) \in \mathcal{R}, \quad (10b)$$

$$x_{v,i} \in \{0,1\}, \forall v \in V, i \in C, \quad (10c)$$

$$r_{(i,s),p} \in \{0,1\}, \forall p \in \mathcal{P}_{(i,s)}, (i,s) \in \mathcal{R}. \quad (10d)$$

This problem is NP-hard, even in the case where routing is fixed: see Shanmugam et al. [9] for a reduction from the 2-Disjoint Set Cover Problem.

Hop-By-Hop Routing.

Similarly to (7), under hop-by-hop routing, the cost of serving (i,s) can be written as:

$$C_{HH}^{(i,s)}(r, X) = \sum_{(u,v) \in G^{(i,s)}} w_{vu} \cdot r_{uv}^{(i)} (1 - x_{u,i}) \cdots \sum_{p \in \mathcal{P}_{(i,s)}^{u}} \prod_{k'=1}^{|p|-1} r_{p_{k'}, p_{k'+1}}^{(i)} (1 - x_{p_{k'},i}). \quad (11)$$

Some embodiments solve:

MINCOST-HH

Minimize $C_{HH}(r, X)$ (12a)

subj. to: $(r, X) \in \mathcal{D}_{HH}$ (12b)

where $C_{HH}(r,X) = \Sigma_{(i,s) \in \mathcal{R}} \lambda_{(i,s)} C_{HH}^{(i,s)}(r,X)$ is the expected routing cost, and $\mathcal{D}_{HH}$ is the set of $(r,X) \in \mathbb{R}^{\Sigma_{i \in C} |E^{(i)}|} \times \mathbb{R}^{|V| \times |C|}$ satisfying the constraints:

$$\Sigma_{i \in C} x_{v,i} = c_v, \forall v \in V, \quad (13a)$$

$$\Sigma_{v:(u,v) \in E^{(i)}} r_{uv}^{(i)} = 1, \forall v \in V, i \in C, \quad (13b)$$

$$x_{v,i} \in \{0,1\}, \forall v \in V, i \in C, \quad (13c)$$

$$r_{uv}^{(i)} \in \{0,1\}, \forall (u,v) \in E^{(i)}, i \in C. \quad (13d)$$

Randomization.

The above routing cost minimization problems can also be stated in the context of randomized caching and routing strategies. For example, in the case of source routing, assuming (a) independent caching strategies across nodes selected at time t=0, with marginal probabilities given by $\Xi$, and (b) independent routing strategies at each source, with marginals given by $\rho$ (also independent from caching strategies), all terms in $C_{SR}$ contain products of independent random variables; this implies that:

$$\mathbb{E}[C_{SR}(r,X)] = C_{SR}[\mathbb{E}[r], \mathbb{E}[X]] = C_{SR}(\rho, \Xi), \quad (14)$$

where the expectation is taken over the randomness of both caching and routing strategies caching and routing strategies. The expected routing cost thus depends on the routing and caching strategies through the expectations $\rho$ and $\Xi$. This has the following consequence:

Lemma 1:

Under randomized routing and caching strategies, problem MINCOST-SR becomes $$\min_{(\rho, \Xi) \in conv(\mathcal{D}_{SR})} C_{SR}(\rho, \Xi), \quad (15)$$

while problem MINCOST-HH becomes $$\min_{(\rho, \Xi) \in conv(\mathcal{D}_{HH})} C_{HH}(\rho, \Xi), \quad (16)$$

where conv($\mathcal{D}_{SR}$), conv($\mathcal{D}_{HH}$) are the convex hulls of $\mathcal{D}_{SR}$, $\mathcal{D}_{HH}$, respectively.

Proof:

Some embodiments prove this for source-routing strategies; the proof for hop-by-hop strategies follows a similar argument. Consider a randomized routing strategy r and a randomized caching strategy X, such that $(r,X) \in \mathcal{D}_{SR}$. Let $\rho = \mathbb{E}[r]$ and $\Xi = \mathbb{E}[X]$. Then $(r,X) \in \mathcal{D}_{SR}$ readily implies that $(\rho, \Xi) \in conv(\mathcal{D}_{SR})$; moreover, by (14), its expected routing cost may be given by $C_{SR}(\rho, \Xi)$, so a randomized solution to MINCOST-SR immediately yields a solution to the relaxed problem. To complete the proof, some embodiments show that any feasible solution $(\rho, \Xi) \in conv(\mathcal{D}_{SR})$, embodiments can construct a MINCOST feasible pair of randomized strategies $(r,X) \in \mathcal{D}_{SR}$ whose expectations are $(\rho, \Xi)$; then, by (14), $\mathbb{E}[C_{SR}(r,X)] = C_{SR}(\rho, X)$. Note that this construction is trivial for routing strategies: given $(\rho, \Xi) \in conv(\mathcal{D}_{SR})$, embodiments can construct a randomized strategy r by setting $r_{(i,s)}$ for each $(i,s) \in \mathcal{R}$ to be an independent categorical variable over $\mathcal{P}_{(i,s)}$ with $P[r_{(i,s),p} = 1] = \rho_{(i,s),p}$, for $p \in \mathcal{P}_{(i,s)}$. It is less obvious how to do so for caching strategies; nevertheless, the technique by [20], [56] discussed in Section VI-D achieves precisely the desired property: given a feasible $\Xi$, it produces a feasible randomized integral X, independent across nodes that (a) satisfies capacity constraints exactly, and (b) has marginals given by E.

The objective functions $C_{SR}$, $C_{HH}$ are not convex and, therefore, the corresponding relaxed problems are not convex optimization problems. This is in stark contrast to single-hop settings, that often can naturally be expressed as linear programs [5], [10], [40].

G. Fixed Routing

When the global routing strategy r is fixed, (9) reduces to

Minimize: $C_{SR}(r,X)$ (17a)

subj. to: X satisfies (10a) and (10c). (17b)

MINCOST—HH can be similarly restricted to caching only. Such restricted optimization exists in in earlier work [20]. In particular, under given global routing strategy r, some embodiments cast (17) as a maximization problem as follows. Let $C_0^r = C_{SR}(r,0) = \Sigma_{(i,s) \in \mathbb{R}} \lambda_{(i,s)} \Sigma_{p \in \mathcal{P}_{(i,s)}} r_{(i,s),p}$ $\Sigma_{k=1}^{|p|-1} w_{p_{k+1}p_k}$ be the cost when all caches are empty (i.e., X is the zero matrix). Note that this is a constant that does not depend on X. Consider the following maximization problem:

Maximize: $F_{SR}^r(X) = C_0^r - C_{SR}(r,X)$ (18a)

subj. to: X satisfies (10a) and (10c). (18b)

This problem is equivalent to (17), in that a feasible solution to (18) is optimal if and only if it also optimal for (17). The objective $F_{SR}^r(X)$, referred to as the caching gain in [20], is monotone, non-negative, and submodular, while the set of constraints on X is a set of matroid constraints. As a result, for any r, there exist standard approaches for constructing a polynomial time approximation method solving the corresponding maximization problem (18) within a 1-1/e factor from its optimal solution [9], [20], [45]. In addition, an embodiment shows in [20] that an approximation method based on a technique known as pipage rounding [36] can be converted into a distributed, adaptive version with the same approximation ratio.

As discussed in Section V, some embodiments also approach the joint routing and caching problem by casting it as an equivalent caching gain maximization problem. In contrast to the fixed routing setting, the objective function $C_{SR}(r,X)$, expressed as a function of both caching and routing strategies, is neither monotone nor supermodular, and there is no constant C such that the function $C - C_{SR}(r,X)$ is monotone and submodular. In addition, constraints (10) do not form a matroid. One of the main contributions is to show that, in spite of these issues, it is still possible to construct a constant approximation method for the maximization of an appropriately defined caching gain; moreover, the intuition behind this method leads again to a distributed, adaptive implementation, as in [20].

H. Greedy Routing Strategies

In the case of source routing, some embodiments identify two "greedy" deterministic routing strategies, that are often used in practice, and play a role in the analysis. According to some embodiments, a global routing strategy r is a route-to-nearest-server (RNS) strategy if all paths it selects are least-cost paths to designated servers, irrespectively of cache contents. Formally, r is RNS if for all $(i,s) \in \mathbb{R}$, $r_{(i,s),p^*}=1$ for some $$p^* \in \underset{p \in \mathcal{P}_{(i,s)}}{\operatorname{argmin}} \sum_{k=1}^{|p|-1} w_{p_{k+1},p_k}, \quad (19)$$

while $r_{(i,s),p}=0$ for all other $p \in \mathcal{P}_{(i,s)}$ such that $p \neq p^*$. Similarly, given a caching strategy X, according to some embodiments, a global routing strategy r is route-to-nearest-replica (RNR) strategy if, for all $(i,s) \in \mathbb{R}$, $r_{(i,s),p^*}=1$ for some $$p^* \in \underset{p \in \mathcal{P}_{(i,s)}}{\operatorname{argmin}} \sum_{k=1}^{|p|-1} w_{p_{k+1},p_k} \prod_{k'=1}^{k} (1 - x_{p_k,i}), \quad (20)$$

while $r_{(i,s),p}=0$ for all other $p \in \mathcal{P}_{(i,s)}$ such that $p \neq p^*$. In contrast to RNS strategies, RNR strategies depend on the caching strategy X. Note that RNS and RNR strategies can be defined similarly in the context of hop-by-hop routing.

IV. Routing to Nearest Server is Suboptimal

A simple approach, followed by most works that optimize caching separately from routing, is to always route requests to the nearest designated server storing an item (i.e., use an RNS strategy). It is therefore interesting to ask how this simple heuristic performs compared to a solution that attempts to solve (9) by jointly optimizing caching and routing. It is easy to see that RNS and, more generally, routing that ignores caching strategies, can lead to arbitrarily suboptimal solutions. In other words, routing to the nearest server can incur a cost that arbitrarily larger than the cost of a strategy (r,X) that is jointly optimized:

Theorem 1:

For any M>0, there exists a caching network for which the route-to-nearest-server strategy r' satisfies $$\min_{X:(r',X) \in \mathcal{D}_{SR}} C_{SR}(r', X) \bigg/ \min_{(r,X) \in \mathcal{D}_{SR}} C_{SR}(r, X) \geq \frac{M+1}{2}. \quad (21)$$

Figure 2:
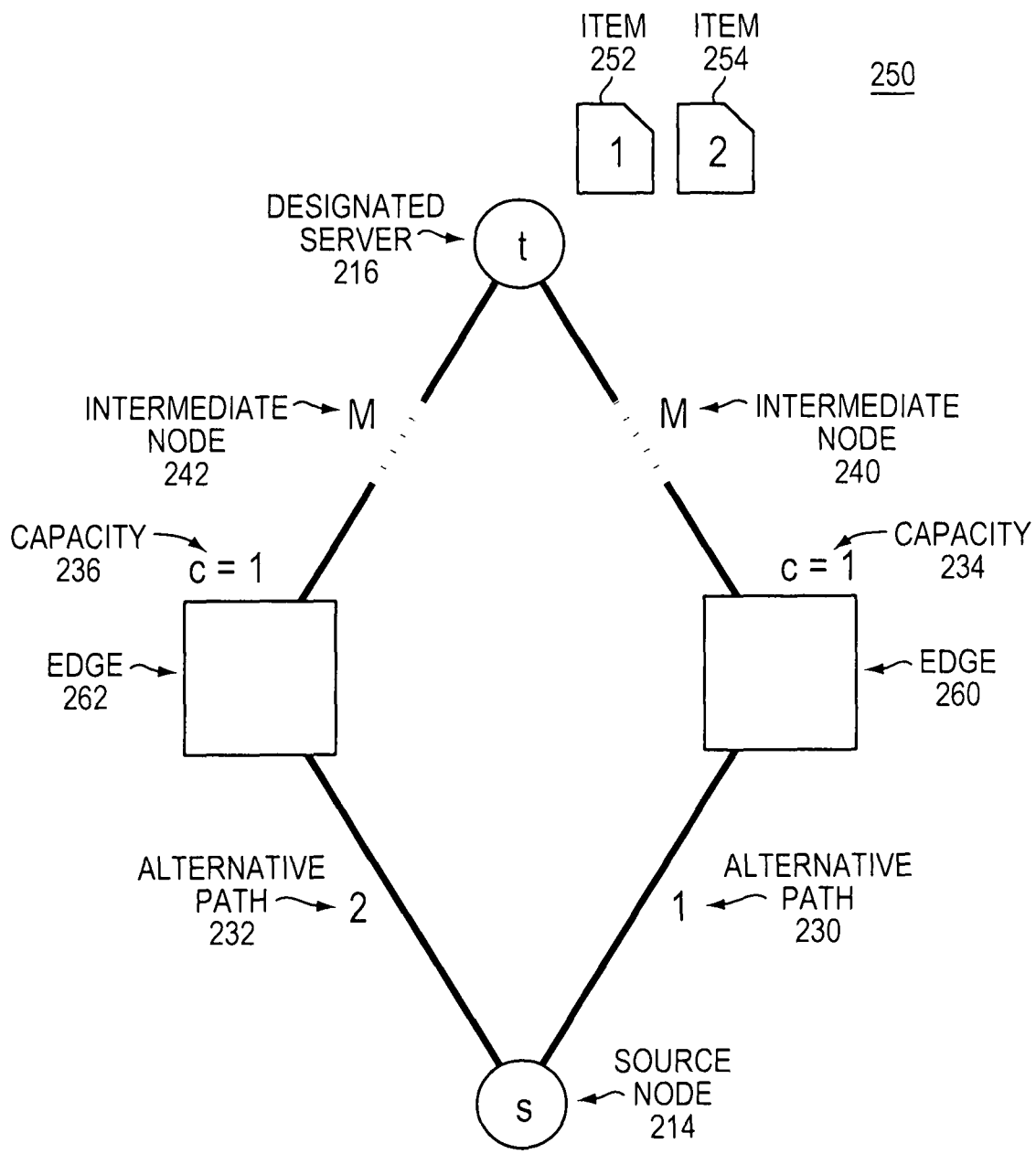
FIG. 2 illustrates a simple diamond network illustrating the benefits of path diversity.

Proof:

Consider the simple diamond network shown in FIG. 2. A source node s generates requests for items 1 and 2 (i.e., $\mathbb{R} = \{(1,s),(2,s)\}$), that are permanently stored on designated server t, requesting each with equal rate $\lambda_{(1,s)} = \lambda_{(2,s)} = 1$ sec$^{-1}$. The path sets $\mathcal{P}_{(i,s)}$, i=1, 2, are identical, and consist of the two alternative paths towards t, each passing through an intermediate node with cache capacity 1 (i.e., able to store only one item). The two paths have routing costs M+1 and M+2, respectively. Under the route-to-nearest server strategy r', requests for both items are forwarded over the path of length M+1 towards t; fixing routes this way leads to a cost M+1 for at least one of the items. This happens irrespectively of which item is cached in the intermediate node. On the other hand, if routing and caching decisions are jointly optimized, requests for the two items can be forwarded to different paths, allowing both items to be cached in the nearby caches, and reducing the cost for both requests to at most 2.

FIG. 2 illustrates a simple diamond network 250 illustrating the benefits of path diversity. In particular, the example in FIG. 2 illustrates that joint optimization of caching and routing decisions benefits the system by increasing path diversity. In turn, increasing path diversity can increase caching opportunities, thereby leading to reductions in caching costs. This is consistent with the experimental results in Section VIII.

According to some embodiments, as illustrated in FIG. 2, a source node s (element 214) generates requests for items 1 and 2 (elements 252, 254, respectively), which are permanently stored on designated server t (element 216). Intermediate nodes (elements 240, 242, respectively) on the are two alternative paths (230, 232, respectively) towards t have capacity 1 (elements 234, 236, respectively). Numbers above edges 260, 262 indicate costs. Under RNS, requests for both items 252, 254 are forwarded over the same path towards t, leading to a $\Theta(M)$ routing cost irrespective of the caching strategy. In contrast, the jointly optimal solution uses different paths 230, 232 per item, leading to an O(1) cost.

V. Offline Source Routing

Motivated by the negative result of Theorem 1, some embodiments solve the offline problem MINCOST-SR. As in the fixed-routing setting described in Section III-G, some embodiments first cast this as a maximization problem. Let $C_0$ be the constant:

$$C_{SR}^0 = \sum_{(i,s)\in\mathcal{R}} \lambda_{(i,s)} \sum_{p\in\mathcal{P}_{(i,s)}} \sum_{k=1}^{|p|-1} w_{p_{k+1}p_k}. \tag{22}$$

Then, given a pair of strategies (r,X), some embodiments define the expected caching gain $F_{SR}(r,X)$ as follows:

$$F_{SR}(r,X)=C_{SR}^0-C_{SR}(r,X), \tag{23}$$

where $C_{SR}$ is the aggregate routing cost given by (8). Note that $F_{SR}(r,X)\geq 0$. Some embodiments solve the following problem, equivalent to MINCOST-SR:

MAXCG-S

Maximize $F_{SR}(r, X)$ (24a)

subj. to: $(r, X) \in \mathcal{D}_{SR}$. (24b)

The selection of the constant $C_{SR}^0$ is not arbitrary: this is the value that allows some embodiments to approximate $F_{SR}$ via the concave relaxation $L_{SR}$ below (c.f. Lemma 2). Moreover, in Sec. VIII an embodiment shows that, in spite of attaining approximation guarantees w.r.t. $F_{SR}$ rather than $C_{SR}$, the resulting approximation method has excellent performance in practice in terms of minimizing routing costs. In particular, embodiments can reduce routing costs by a factor as high as $10^3$ compared to fixed routing policies, including the one described in [20].

A. Offline Approximation Method

Its equivalence to MINCOST-SR implies that MAXCG-S is also NP-hard. Nevertheless, an embodiment shows that there exists a polynomial time approximation method for MAXCG-S. Following [36], the technique for producing an approximation method to solve MAXCG-S is to: (a) relax the combinatorial joint routing and caching problem to a convex optimization problem, (b) solve this convex relaxation, and (c) round the (possibly fractional) solution to obtain an integral solution to the original problem. To that end, consider the concave function $L_{SR}$: conv($\mathcal{D}_{SR}$)$\to\mathbb{R}_+$, defined as:

$$L_{SR}(\rho, \Xi) = \tag{25}$$

$$\sum_{(i,s)\in\mathcal{R}} \lambda_{(i,s)} \sum_{p\in\mathcal{P}_{(i,s)}} \sum_{k=1}^{|p|-1} w_{p_{k+1}p_k} \cdot \ldots \min\left\{1, 1-\rho_{(i,s),p}+\sum_{k'=1}^{k}\xi_{p_{k'}i}\right\}.$$

Then, $L_{SR}$ closely approximates $F_{SR}$:

Lemma 2 For all $(\rho,\Xi)\in\text{conv}(\mathcal{D}_{SR})$, $(1-1/e)L_{SR}(\rho,\Xi)\leq F_{SR}(\rho,\Xi)\leq L_{SR}(\rho,\Xi)$.

Proof:

This follows from the Goemans-Williamson inequality [20], [57], which states that, for any sequence of $y_i\in[0,1]$, $i\in\{1, \ldots, n\}$:

$$\left(1-\frac{1}{e}\right)\min\left\{1, \sum_{i}^{n} y_i\right\} \leq 1-\prod_{i=1}^{n}(1-y_i) \leq \min\left\{1, \sum_{i=1}^{n} y_i\right\}. \tag{26}$$

The lower bound was proved by Goemans and Williamson (see Lemma 3.1 in [57], and Eq. (16) of Ageev and Sviridenko [36] for a shorter derivation). The upper bound follows easily from the concavity of the min operator (see Theorem 2 of Ioannidis and Yeh [20]). To see this, let $t_i\in\{0,1\}$, $i\in\{1, \ldots, n\}$, be independent Bernoulli random variables with expectations $\mathbb{E}[t_i]=y_i$. Then:

$$1-\prod_{i=1}^{n}(1-y_i) = P\left[\sum_{i=1}^{n} t_i > 0\right] = \tag{26}$$

$$\mathbb{E}\left[\min\left\{1, \sum_{i=1}^{n} t_i\right\}\right] \leq \min\left\{1, \sum_{i=1}^{n}\mathbb{E}[t_i]\right\} = \min\left\{1, \sum_{i=1}^{n} y_i\right\}$$

where the inequality holds by Jensen's inequality and the fact that min{1,·} is concave. The lemma therefore follows by applying inequality (26) to every term in the summation making up $F_{SR}$, to all variables $\xi_{vi}$, $v\in V$, $i\in\mathcal{C}$, and $1-\rho_{(i,s),p}$, $(i,s)\in\mathcal{R}$, $p\in\mathcal{P}_{(i,s)}$.

Constructing a constant-approximation method for MAXCG-S amounts to the following steps. First, some embodiments obtain $$(\rho^*, \Xi^*) \in \underset{(\rho,\Xi)\in\text{conv}(\mathcal{D}_{SR})}{\text{argmin}} L_{SR}(\rho, \Xi). \tag{27}$$

---

Method 1 - Offline Approximation Method

1: Find $(\rho^*,\Xi^*) \in \arg\max_{(\rho,\Xi)\in\text{conv}(\mathcal{D}_{SR})} L_{SR}(\rho,\Xi)$
2: Fix $\rho^*$, and round $\Xi^*$ as in Lemma 3 to obtain integral, feasible X' s.t $F_{SR}(\rho^*,X') \geq F_{SR}(\rho^*,\Xi^*)$
3: Fix X', and round $\rho^*$ as in Lemma 4 to obtain integral, feasible r' s.t. $F_{SR}(r',X') \geq F_{SR}(\rho^*,X')$
4: return (r',X')

---

As $L_{SR}$ is concave function and conv($\mathcal{D}_{SR}$) is convex, the above maximization is a convex optimization problem. The above maximization can be reduced to a linear program [20], and can be solved in polynomial time [58]. Second, some embodiments round the (possibly fractional) solution ($\rho^*$, $\Xi^*)\in\text{conv}(\mathcal{D}_{SR})$ to an integral solution $(r,X)\in\mathcal{D}_{SR}$ such that $F_{SR}(r,X) \geq F_{SR}(\rho^*,\Xi^*)$. This rounding is deterministic and takes place in polynomial time. The above steps are summarized in Method 1, for which the following theorem holds:

Theorem 2

Method 1 terminates within a number of steps that is polynomial in $|V|$, $|C|$, and $P_{SR}$, and produces a strategy $(r',X')\in\mathcal{D}_{SR}$ such that $$F_{SR}(r',X') \geq (1-1/e)\max_{(r,X)\in\mathcal{D}_{SR}} F_{SR}(r,X).$$

Proof:

Some embodiments first prove the following two auxiliary lemmas. First, a feasible fractional solution can be converted—in polynomial time—to a feasible solution in which only $\rho$ is fractional, while increasing $F_{SR}$.

Lemma 3 ([9]):

Given any $(\rho,\Xi)\in\text{conv}(\mathcal{D}_{SR})$, an integral $X$ such that $(\rho,X)\in\text{conv}(\mathcal{D}_{SR})$ and $F_{SR}(\rho,X) \geq F_{SR}(\rho,\Xi)$ can be constructed in $O(|V|^2|C|P_{SR})$ time.

Proof:

This is proved in [9] for fixed routing strategies; for completeness, some embodiments repeat the proof here. Given a fractional solution $(\rho,\Xi)\in\mathcal{D}_{SR}$, there exist a $v\in V$ that contains two fractional values $\xi_{vi},\xi_{vi'}$, as capacities are integral. Restricted to these two variables, function $F_{SR}$ is an affine function of $\xi_{vi},\xi_{vi'}$, that is, $$F_{SR}(\rho,\Xi) = A\xi_{vi} + B\xi_{vi'} + C = F_{SR}^{vi,vi'}(\xi_{vi},\xi_{vi'}),$$

where constants $A$, $B$, $C$ depend on $\rho$ and $\Xi_{-(vi,vi')}$ (the values of $\Xi$ excluding $\xi_{vi},\xi_{vi'}$), but not on $\xi_{vi},\xi_{vi'}$. Hence, $F_{SR}^{vi,vi'}(\xi_{vi},\xi_{vi'})$ is maximized at the extrema of the polytope in $\mathbb{R}^2$ implied by the capacity and $[0,1]$ constraints involving variables $\xi_{vi},\xi_{vi'}$ alone. Formally, consider the polytope:

$$\mathcal{D}_{SR}^{(vi,vi')}(\Xi_{-(vi,vi)}) = \left\{(\xi_{vi},\xi_{vi'}) \in [0,1]^2 : \sum_{j\in C}\xi_{vj} = c_v\right\} \subset \mathbb{R}^2.$$

Then, the optimization:

$$\max_{(\xi_{vi},\xi_{vi'})\in\mathcal{D}_{SR}^{(vi,vi')}(\Xi_{-(vi,vi)})} F_{SR}^{vi,vi'}(\xi_{vi},\xi_{vi'})$$

has a solution that is an extremum of $\mathcal{D}_{SR}^{(vi,vi')}(\Xi_{-(vi,vi)})$. That is, there exists an optimal solution to this problem where either $\xi_{vi}$ $\xi_{vi'}$ is integral (either 0 or 1). Finding this solution amounts to testing two cases and seeing which of the two maximizes $F_{SR}^{vi,vi'}$ (and thereby also $F_{SR}$): (a) the case where a value $\delta=\min\{\xi_{vi},1-\xi_{vi'}\}$ is subtracted from $\xi_{vi}$ and added to $\xi_{vi'}$, and (b) the case where $\delta'=\min\{1-\xi_{vi},\xi_{vi'}\}$ is subtracted from $\xi_{vi'}$ and added to $\xi_{vi}$.

The above imply that there exists a way to transfer equal mass from one of the two fractional variables $\xi_{vi},\xi_{vi'}$ to the other so that (a) one of them becomes integral (either 0 or 1), (b) the resulting $\Xi'$ remains feasible, and (c) $F_{SR}$ does not decrease. Performing this transfer of mass reduces the number of fractional variables in $\Xi$ by one, while maintaining feasibility and, crucially, either increasing $F_{SR}$ or keeping it constant. This rounding can be repeated so long as $\Xi$ remains fractional: this eliminates fractional variables in at most $O(|V||C|)$ steps. Each step requires at most two evaluations of $F_{SR}$ for each of the two cases, which can be done in $O(|V|P_{SR})$ time. Note that the pair of fractional variables selected each time is arbitrary: the order of elimination (i.e., the order with which pairs of fractional variables are rounded) leads to a different rounding, but such roundings are (a) feasible and, (b) either increase $F_{SR}$ or keep it constant. The routing strategy $\rho$ can also be rounded in polynomial time, while keeping the caching strategy $X$ fixed:

Lemma 4

Given any $(\rho,\Xi)\in\text{conv}(\mathcal{D}_{SR})$, an integral $r$ such that $(r,\Xi)\in\text{conv}(\mathcal{D}_{SR})$ and $F_{SR}(r,\Xi) \geq F_{SR}(\rho,\Xi)$ can be constructed in $O(|V|P_{SR})$ time. Moreover, if $\Xi$ is integral, then the resulting $r$ is a route-to-nearest-replica (RNR) strategy.

Proof:

Given $(\rho,\Xi)\in\text{conv}(\mathcal{D}_{SR})$, notice that, for fixed $\Xi$, $F_{SR}$ is an affine function of the routing strategy $\rho$. Coefficients involving variables $\rho_{(i,s),p}$, $p \in \mathcal{P}_{(i,s)}$, are non-negative, and the set of constraints on $\rho$ is separable across requests $(i,s)\in\mathcal{R}$. Hence, given $\Xi$, maximizing $F_{SR}$ w.r.t. $\rho$ can be done by selecting the path $p^*\in\mathcal{P}_{(i,s)}$ with the highest coefficient of $F_{SR}$, for every $(i,s)\in\mathcal{P}$; this is precisely the lowest cost path, i.e., $p^*_{(i,s)}\in\mathcal{P}_{(i,s)}$ is such that $$p^*_{(i,s)} = \operatorname*{argmin}_{p\in\mathcal{P}_{(i,s)}} \sum_{k=1}^{|p|-1} w_{p_{k+1}p_k} \prod_{k'=1}^{k}(1-\xi_{p_{k'}i}). \tag{28}$$

Hence, given $\Xi$, setting $\rho_{(i,s),p^*}=1$, and $p_{(i,s),p}=0$ for remaining paths $p\in\mathcal{P}_{(i,s)}$ such that $p\neq p^*$ can increase $F_{SR}$. Each $p^*$ can be computed in $O(|\mathcal{P}_{(i,s)}||V|)$ time and there is most $O(\mathcal{R})$ such paths. This results in an integral, feasible strategy $r$, and the resulting $F_{SR}$ either increases or stays constant, i.e., $(r,\Xi)\in\text{conv}(\mathcal{D}_{SR})$ and $F_{SR}(r,\Xi) \geq F_{SR}(\rho,\Xi)$. Finally, if $\Xi=X$ for some integral $X$, then the selection of each strategy $p^*$ through (28) yields a route-to-nearest-replica routing for $(i,s)$.

To conclude the proof of Theorem 2, note that the complexity statement is a consequence of Lemmas 3 and 4. By construction, the output of the method $(r',X')$ is such that: $F_{SR}(r',X') \geq F_{SR}(\rho^*,\Xi^*)$. Let $$(r^*,X^*) \in \operatorname*{argmax}_{(r,X)\in\mathcal{D}_{SR}} F_{SR}(r,X)$$

be an optimal solution to MaxCG-S. Then, by Lemma 2 and the optimality of $(\rho^*,X^*)$ in $\text{conv}(\mathcal{D}_{SR})$:

$$F_{SR}(r^*,X^*) \leq L_{SR}(r^*,X^*) \leq L_{SR}(\rho^*,\Xi^*) \leq \frac{e}{e-1}F_{SR}(\rho^*,\Xi^*).$$

Together, these imply that the constructed $(r',X')$ is such that $F_{SR}(r',X') \geq (1-1/e)F_{SR}(r^*,X^*)$.

B. Implications: RNS and an Equivalence Theorem

Lemma 4 has the following immediate implication:

Corollary 1—

There exists an optimal solution $(r^*,X^*)$ to MAXCG-S (and hence, to MinCost-SR) in which $r^*$ is an route-to-nearest-replica (RNR) strategy w.r.t. $X^*$.

Let ($r^*$,$X^*$) be an optimal solution to MaxCG-S in which $r^*$ is not a RNR strategy. Then, by Lemma 4, embodiments can construct an r' that is an RNR strategy w.r.t. X such that (a) $F_{SR}(r',X^*) \geq F_{SR}(r^*,X^*)$ and (b) $(r',X^*) \in \mathcal{D}_{SR}$. As ($r^*$,$X^*$) is optimal, so is (r',$X^*$).

Although, in light of Theorem 1, Corollary 1 suggests an advantage of RNR over RNS strategies, its proof is non-constructive, not providing an method to find an optimal solution, RNR or otherwise.

Embodiments can also show the following result regarding randomized strategies. For $\mu$ a probability distribution over $\mathcal{D}_{SR}$, let $\mathbb{E}_\mu[C_{SR}(r,X)]$ be the expected routing cost under $\mu$. Then, the following equivalence theorem holds:

Theorem 3

The deterministic and randomized versions of MinCost-SR attain the same optimal routing cost, i.e.:

$$\min_{(r,X) \in \mathcal{D}_{SR}} C_{SR}(r, X) = \min_{(\rho, \Xi) \in conv(\mathcal{D}_{SR})} C_{SR}(\rho, \Xi) \quad (29)$$
$$= \min_{\mu: supp(\mu) = \mathcal{D}_{SR}} \mathbb{E}_\mu[C_{SR}(r, X)]$$

Proof:

Clearly, $$\min_{(r,X) \in \mathcal{D}_{SR}} C_{SR}(r, X) \geq \min_{(\rho, \Xi) \in conv(\mathcal{D}_{SR})} C_{SR}(\rho, \Xi)$$

as $\mathcal{D}_{SR} \subset conv(\mathcal{D}_{SR})$. Let $$(\rho^*, \Xi^*) \in \operatorname*{argmin}_{(\rho, \Xi) \in conv(\mathcal{D}_{SR})} C_{SR}(\rho, \Xi) = \operatorname*{argmax}_{(\rho, \Xi) \in conv(\mathcal{D}_{SR})} F_{SR}(\rho, \Xi).$$

Then, Lemmas 3 and 4 imply that embodiments can construct an integral (r", X") $\in \mathcal{D}_{SR}$ such that $$F_{SR}(r'', X'') \geq F_{SR}(\rho^*, \Xi^*). \quad (30)$$

Hence, $$\min_{(r,X) \in \mathcal{D}_{SR}} C_{SR}(r, X) \leq C_{SR}(r'', X'') \leq C_{SR}(\rho^*, \Xi^*), \quad (30)$$

and the first equality holds.

Note that for $\mu^* \in \arg\min_{\mu:supp(\mu)=\mathcal{D}_{SR}} \mathbb{E}_\mu[C_{SR}(r,X)]$, and ($r^*$,$X^*$)=arg $\min_{(r,X) \in \mathcal{D}_{SR}} C_{SR}(r,X)$, some embodiments have that $$\mathbb{E}_\mu \cdot [C_{SR}(r, X)] =$$
$$\min_{\mu: supp(\mu)=\mathcal{D}_{SR}} \mathbb{E}_\mu[C_{SR}(r, X)] \leq \min_{(r,X) \in \mathcal{D}_{SR}} C_{SR}(r, X) = C_{SR}(r^*, X^*),$$

as deterministic strategies are a subset of randomized strategies. On the other hand, $$\mathbb{E}_\mu \cdot [C_{SR}(r, X)] =$$
$$\sum_{(r,X) \in \mathcal{D}_{SR}} \mu((r, X))C_{SR}(r, X) \geq C_{SR}(r^*, X^*) \sum_{(r,X) \in \mathcal{D}_{SR}} \mu((r, X)) =$$
$$C_{SR}(r^*, X^*).$$

and the second equality also follows.

The first equality of the theorem implies that, surprisingly, there is no inherent advantage in randomization: although randomized strategies constitute a superset of deterministic strategies, the optimal attainable routing cost (or, equivalently, caching gain) is the same for both classes. The second equality implies that assuming independent caching and routing strategies is as powerful as sampling routing and caching strategies from an arbitrary joint distribution. Theorem 3 generalizes Theorem 5 of [20], which pertains to optimizing caching alone.

VI. Online Source Routing

The method in Theorem 2 is offline and centralized: it assumes full knowledge of the input, including demands and arrival rates, which are rarely available in practice. To that end, some embodiments solve MaxCG-S in the online setting, in the absence of any a priori knowledge of the demand. The main contribution is to show that an expected caching gain within a constant approximation of the optimal solution to the offline problem MaxCG-S can be attained in steady state by a distributed, adaptive method:

Theorem 4—

According to some embodiments, there exists a distributed, adaptive method constructing randomized strategies $(r^{(k)}, X^{(k)}) \in \mathcal{D}_{SR}$ at the k-th slot that satisfy $$\lim_{k \to \infty} \mathbb{E}[F_{SR}(r^{(k)}, X^{(k)})] \geq (1 - 1/e) \max_{(r,X) \in \mathcal{D}_{SR}} F_{SR}(r, X). \quad (31)$$

Note that, despite the fact that the method has no prior knowledge of the demands, the guarantee provided is w.r.t. an optimal solution of the offline problem (24). The method naturally generalizes [20]: when the path sets $\mathcal{P}_{(i,s)}$ are singletons, and routing is fixed, the method coincides with the cache-only optimization method in [20]. Interestingly, the method casts routing and caching in the same control plane: the same quantities are communicated through control messages to adapt both the caching and routing strategies.

A. Method Overview

Before proving Theorem 4, a brief overview is provided herein, according to some embodiments, of the distributed, adaptive method that attains the approximation ratio of the theorem, and state its convergence guarantee precisely. Intuitively, the method that attains the guarantees of Theorem 4 solves the problem:

$$\max_{(\rho, \Xi) \in conv(\mathcal{D}_{SR})} L_{SR}(\rho, \Xi), \quad (32)$$

where function $L_{SR}: conv(\mathcal{D}_{SR}) \to \mathcal{R}_+$ is the approximation of the caching gain $F_{SR}$ given by (25). Recall that, in contrast to (15), (32) is a convex optimization problem by the concavity of $L_{SR}$. Some embodiments distributed adaptive method effectively performs a projected gradient ascent to solve the convex relaxation (32) in a distributed, adaptive fashion. The concavity of $L_{SR}$ ensures convergence, while Lemma 2 ensures that the caching gain attained in steady state is within an $$1 - \frac{1}{e}$$

factor from the optimal.

In more detail, recall from III-E that, in the online setting, time is partitioned into slots of equal length T>0. Caching and routing strategies are randomized as described in Sec. III: at the beginning of a timeslot, nodes place a random set of contents in their cache, independently of each other. During a timeslot, new requests are routed upon arrival over random paths, selected independently of (a) past routes followed, and (b) of past and present caching decisions.

Nodes in the network maintain the following state information. Each node $v \in G$ maintains locally a vector $\xi \in [0,1]^{|C|}$, determining a randomized caching strategy for each node. Moreover, for each request $(i,s) \in \mathcal{R}$, source node s maintains a vector $\rho_{(i,s)} \in [0,1]^{|\mathcal{P}(i,s)|}$, determining a randomized routing strategy for each node. Together, these variables represent the global state of the network, denoted by $(\rho, \Xi) \in \text{conv}(\mathcal{D}_{SR})$. When the timeslot ends, each node performs the following four tasks:

1) Subgradient Estimation.

Each node uses measurements collected during the duration of a timeslot to construct estimates of the gradient of $L_{SR}$ w.r.t. its own local state variables. As $L_{SR}$ is not everywhere differentiable, an estimate of a subgradient of $L_{SR}$ is computed instead.

2) State Adaptation.

Nodes adapt their local caching and routing state variables $\xi_v$, $v \in V$, and $\rho_{(i,s)}$, $(i,s) \in \mathcal{R}$, pushing the caching and routing state variables towards a direction that increases $L_{SR}$, as determined by the estimated subgradients, while maintaining feasibility in $\text{conv}(\mathcal{D}_{SR})$.

3) State Smoothening.

Nodes compute "smoothened" versions $\bar{\xi}_v$, $v \in V$, and $\bar{\rho}_{(i,s)}$, $(i,s) \in \mathcal{R}$, interpolated between present and past states. This is preferred on account of the non-differentiability of $L_{SR}$.

4) Randomized Caching and Routing.

After smoothening, each node v reshuffles the contents of its cache using the smoothened caching marginals $\bar{\xi}_v$, producing a random placement (i.e., caching strategy $x_v$) to be used throughout the next slot. Moreover, each node $s \in V$ routes requests $(i,s) \in \mathcal{R}$ received during next timeslot over random paths (i.e., routing strategies $r_{(i,s)}$) sampled in an independent and identically distributed (herein "i.i.d.") fashion from the smoothened marginals $\bar{\rho}_{(i,s)}$.

Pseudocode summarizing these steps of the method is provided in Method 2.

Convergence Guarantees.

Together, the four tasks above ensure that, in steady state, the expected caching gain of the jointly constructed routing and caching strategies is within a constant approximation of the optimal solution to the offline problem MAXCG-S. The proof of the convergence of the method relies on the following key lemma, proved in Section VI-E:

Lemma 5

Let $(\bar{\rho}^{(k)}, \bar{\Xi}^{(k)}) \in \text{conv}(\mathcal{D}_{SR})$ be the smoothened state variables at the k-th slot of Method 2, and $$(\rho^*, \Xi^*) \in \underset{(\rho, \Xi) \in \text{conv}(\mathcal{D}_{SR})}{\operatorname{argmax}} L_{SR}(\rho, \Xi).$$

Then, for $\gamma_k$ the step-size used in projected gradient ascent, $$\varepsilon_k \equiv \mathbb{E}[L_{SR}(\rho^*, \Xi^*) - L_{SR}(\bar{\rho}^{(k)}, \bar{\Xi}^{(k)})] \leq \frac{D^2 + M^2 \sum_{\ell=k/2}^{k} \gamma_\ell^2}{2 \sum_{\ell=k/2}^{k} \gamma_\ell},$$

where $$D = \sqrt{2|V| \max_{v \in V} c_v + 2|\mathcal{R}|}, \text{ and}$$

$$M = W|V|\Lambda \sqrt{(|V||C|P_{SR}^2 + |\mathcal{R}|P_{SR})\left(1 + \frac{1}{\Lambda T}\right)}.$$

In particular, if $\gamma_k = 1/\sqrt{k}$, then $\varepsilon_k = O(1/\sqrt{k})$.

Lemma 5 establishes that Method 2 converges arbitrarily close to an optimizer of $L_{SR}$. As, by Lemma 2, this is a close approximation of $F_{SR}$, the limit points of the method are with the 1−1/e from the optimal. Crucially, Lemma 5 can be used to determine the rate of convergence of the method, by determining the number of steps required for $\varepsilon_k$ to reach a desired threshold δ. Moreover, through quantity M, Lemma 5 establishes a tradeoff w.r.t. T: increasing T decreases the error in the estimated subgradient, thereby reducing the total number of steps until convergence, but also increases the time taken by each step.

The convergence guarantee in Lemma 5 holds under the assumption that (a) although unknown, demands are stationary, and (b) $\gamma_k$ converges to zero. In practice, according to some embodiments, caches adapt to demand fluctuations. To achieve this, some embodiments may fix γ to a constant positive value, ensuring that Method 2 tracks demand changes. Though convergence to a minimizer is not guaranteed in this case, the method is nonetheless guaranteed to reach states concentrated around an optimal allocation (see, e.g., Chapter 8 of Kushner & Yin [59]).

The remainder of this section describes in detail the constituent four steps of the method (namely, subgradient estimation, state adaptation, smoothening, and random sampling). These are presented in Sections VI-B to VI-D, respectively. Proofs are presented of Lemma 5 and of Theorem 4 in Sections VI-E and VI-F, respectively. Finally, some embodiments include a modification that reduce overhead due to control messages in Section VI-G.

B. Subgradient Estimation

According to some embodiments, a description follows how to estimate the subgradients of $L_{SR}$ through measurements collected during a timeslot. These estimates are computed in a distributed fashion at each node, using only information available from control messages traversing the node. Let $(\rho^{(k)}, \Xi^{(k)}) \in \text{conv}(\mathcal{D}_{SR})$ be the pair of global states at the k-th measurement period. At the conclusion of a timeslot, each $v \in V$ produces a random vector $z_v = z_v(\rho^{(k)}, \Xi^{(k)}) \in \mathbb{R}_+^{|C|}$ that is an unbiased estimator of a subgradient of $L_{SR}$ w.r.t. to $\xi_v$. Similarly, for every $(i,s) \in \mathcal{R}$, source node s produces a random vector $q_{(i,s)} = q_{(i,s)}(\rho^{(k)}, \Xi^{(k)}) \in \mathbb{R}^{|\mathcal{P}_{(i,s)}|}$ that is an unbiased estimator of a subgradient of $L_{SR}$ with respect to (w.r.t.) $\rho_{(i,s)}$. Formally, $$\mathbb{E}[z_v(\rho^{(k)}, \Xi^{(k)})] \in \partial_{\xi_v} L_{SR}(\rho^{(k)}, \Xi^{(k)}), \quad (33)$$

$$\mathbb{E}[q_{(i,s)}(\rho^{(k)}, \Xi^{(k)})] \in \partial_{\rho_{(i,s)}} L_{SR}(\rho^{(k)}, \Xi^{(k)}), \quad (34)$$

where $\partial_{\xi_v} L_{SR}(\rho, \Xi)$, $\partial_{\rho_{(i,s)}} L_{SR}$ are the sets of subgradients of $L_{SR}$ w.r.t. $\xi_v$ and $\rho_{(i,s)}$, respectively. To produce these estimates, nodes measure the upstream cost incurred at paths passing through it using control messages, exchanged among nodes as follows:

1. Every time a nodes generates a new request (i,s), it also generates additional control messages, one per path $p \in \mathcal{P}_{(i,s)}$. The message corresponding to path p is to be propagated over p, and contains a counter initialized to $1 - \rho_{(i,s),p} + \xi_{si}$.

2. When following path p, the message is forwarded until a node $u \in p$ such that $1 - \rho_{(i,s),p} + \sum_{\ell=1}^{k_p(u)} \xi_{p\ell i} > 1$ is found, or the end of the path is reached. To keep track of this, every $v \in p$ traversed adds its state variable $\xi_{vi}$ to the message counter.

3. Upon reaching either such a node u or the end of the path, the control message is sent down in the reverse direction. Initializing its counter to zero, every time it traverses an edge in this reverse direction, it adds the weight of this edge into a weight counter.

4. Every node on the reverse path "sniffs" the weight counter of the control message, learning the sum of weights of all edges further upstream towards u; that is, recalling that $k_p(v)$ is the position of visited node $v \in p$, v learns the quantity:

$$t_{vi} = \sum_{k'=k_v(p)}^{|p|-1} w_{p_{k'+1} p_{k'}} \mathbb{1}\left(1 - \rho_{(i,s),p} + \sum_{\ell=1}^{k'} \xi_{p\ell i} \leq 1\right), \quad (35)$$

where $\mathbb{1}(E)$ is 1 if and only if E is true and 0 one way ("one way" also referred to as "o.w" herein).

5. In addition, the source s of the request, upon receiving the message sent over the reverse path, "sniffs" the quantity:

$$t_{(i,s),p} = -\sum_{k'=1}^{|p|-1} w_{p_{k'+1} p_{k'}} \mathbb{1}\left(1 - \rho_{(i,s),p} + \sum_{\ell=1}^{k'} \xi_{p\ell i} \leq 1\right) \quad (36)$$

This is the (negative of) the sum of weights accumulated by the control message returning to the source s.

Figure 3A:
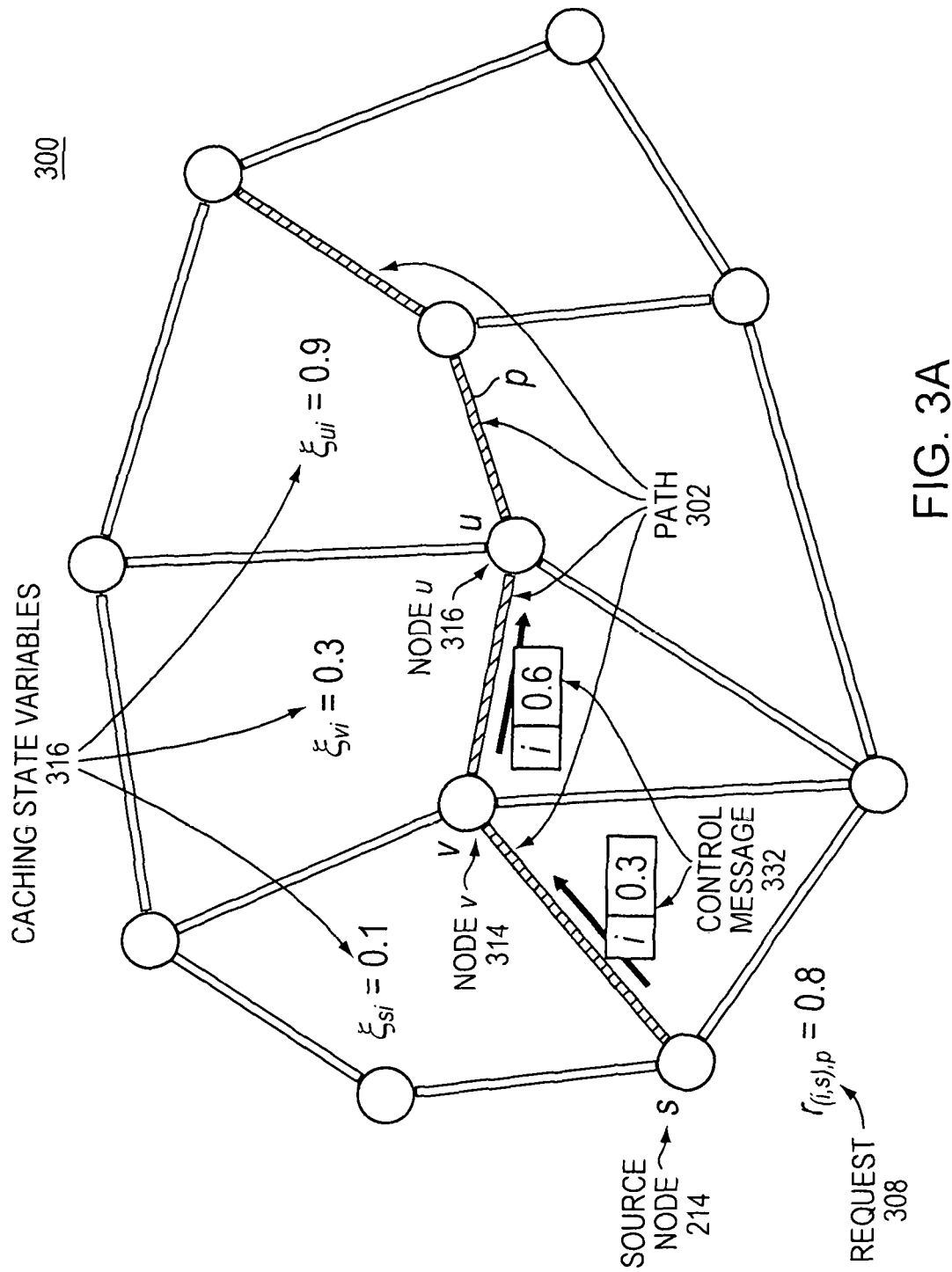
FIGS. 3A-C illustrate a node generating a request and control message, according to some embodiments.
Figure 3B:
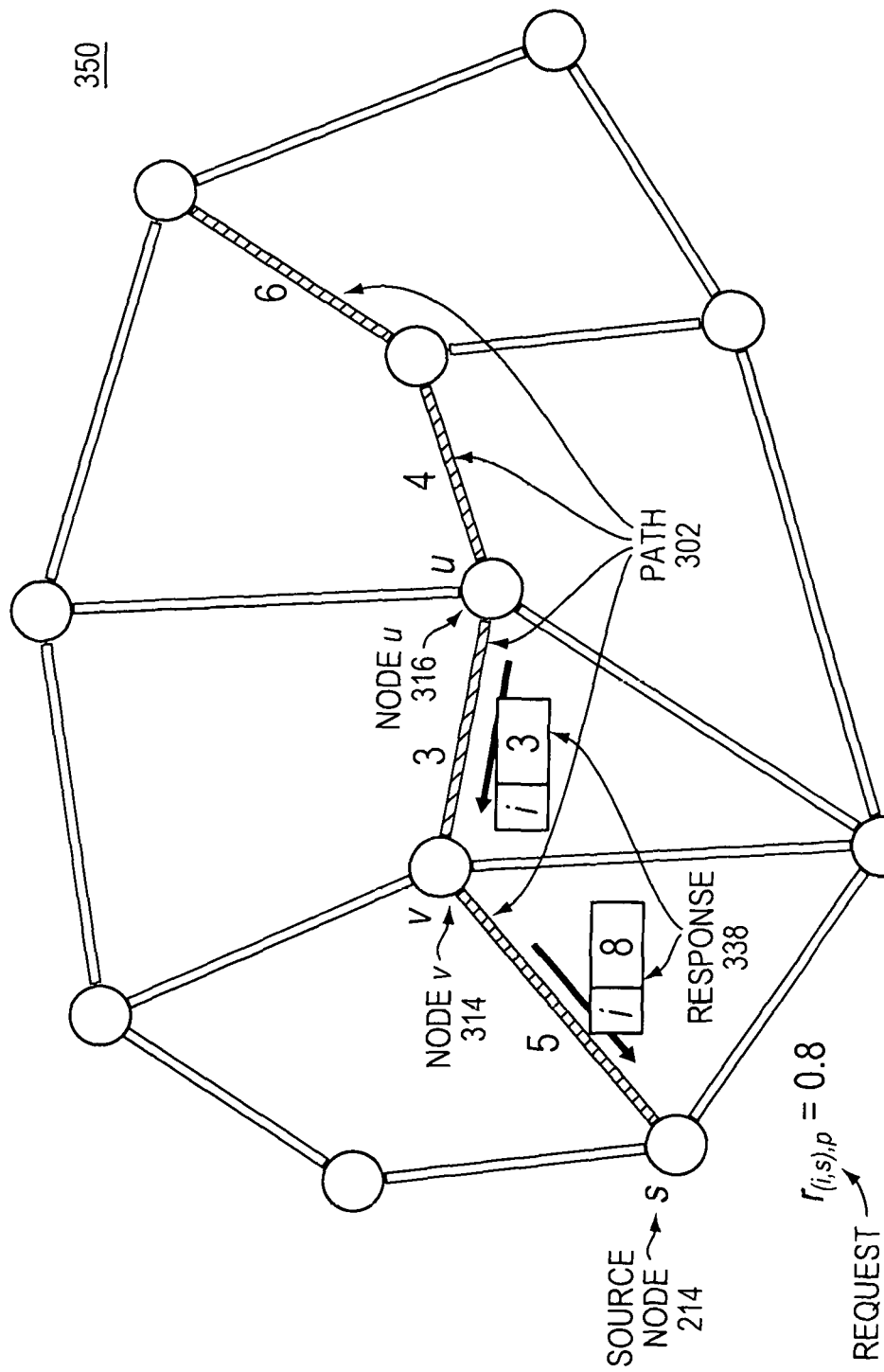
Figure 3C:
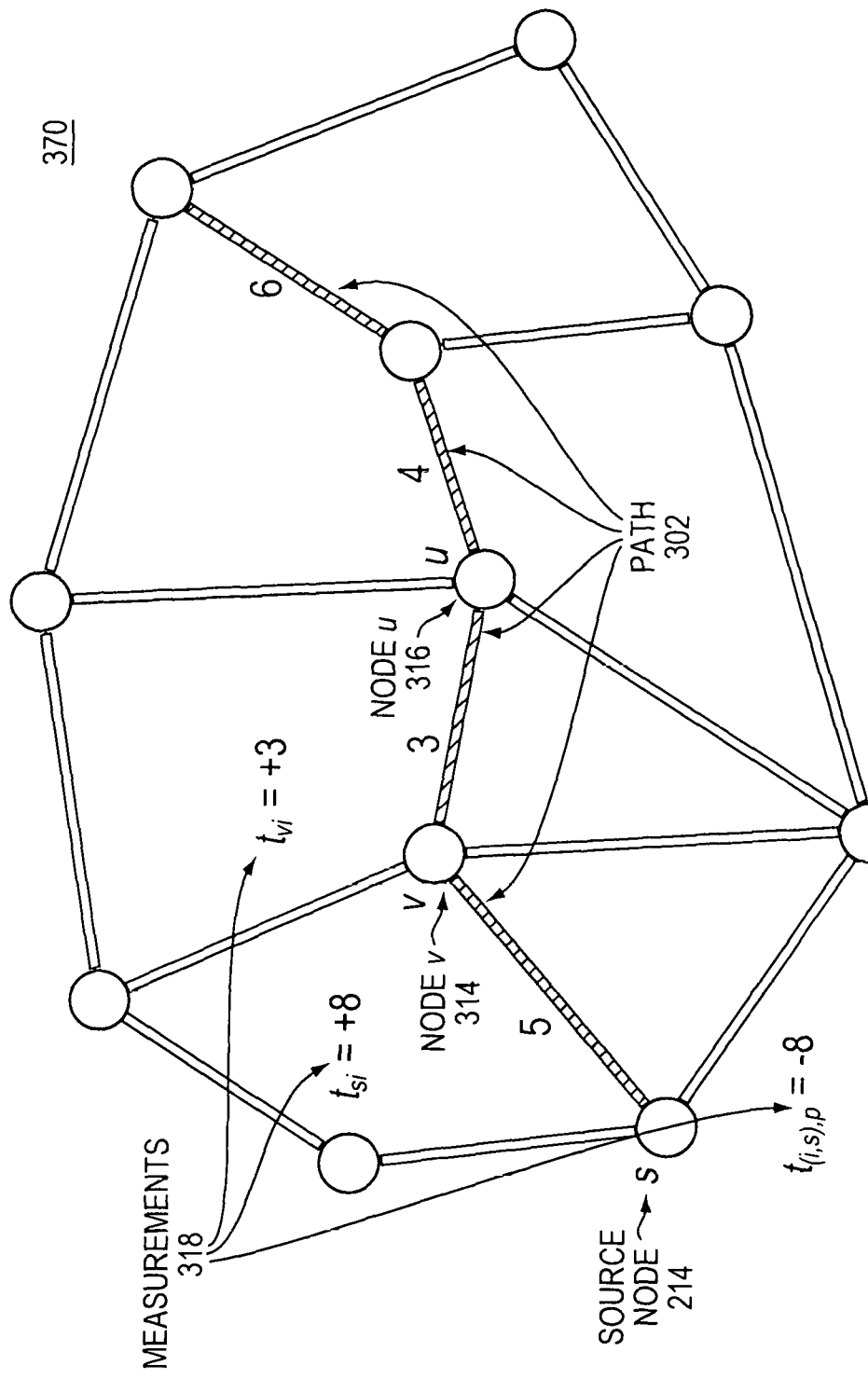

An example illustrating the above five steps can be found in FIGS. 3A-C. FIGS. 3A-C illustrate a node generating a request and control message, according to some embodiments.

According to some embodiments, as illustrated collectively in FIGS. 3A-C (elements 300, 350, 370, respectively), when source node s (element 214) generates a request (i,s)∈$\mathcal{R}$ (element 308), the source node s (element 214) also generates a control message 332 for every path $p \in \mathcal{P}_{(i,s)}$ (element 302), the path 302 indicated by thick red edges in FIGS. 3A-C. In FIG. 3A, the control message counter is initialized to $(1-r_{(i,s),p}) + \xi_{si} = 1 - 0.8 + 0.1 = 0.3$ by node s (element 214). The control message 332 is forwarded upstream along path p (element 302) to node v (element 314) that adds its own caching state variable w.r.t. item i, namely $\xi_{vi} = 0.3$ (caching state variable 316), to the counter. As the sum is below 1.0, the message is forwarded upstream, until it reaches node u (element 316) with $\xi_{ui} = 0.9$ (caching state variable 316).

As illustrated in FIG. 3B, as the total sum of the caching state variables 316 (of FIG. 3A) is now >1.0, the propagation over path p (element 302) terminates, and a response 338 is sent downstream by node u (element 316). The response is shown in FIG. 3B, accumulating the weights of edges it traverses.

Nodes in the path of the response 338, namely node v (element 314) and s (element 214), sniff information, as shown in FIG. 3C, and collect measurements $t_{vi}$, $t_{si}$ (elements 318) to be added to the averages estimating $\partial_{\xi_{vi}} L_{SR}$ and $\partial_{\xi_{si}} L_{SR}$, respectively. The source node s (element 214) also collects measurement $t_{(i,s),p} = -t_{si}$ (element 318) to be used in the average estimating $\partial_{\rho_{(i,s),p}} L$.

Let $\mathcal{T}_{vi}$ be the set of quantities collected in this way at node v regarding item $i \in \mathcal{C}$ during a measurement period of duration T. At the end of the timeslot, each node $v \in V$ produces $z_v$ as follows:

$$z_{vi} = \sum_{t \in \mathcal{T}_{vi}} t/T, \ i \in \mathcal{C}. \quad (37)$$

Similarly, let $\mathcal{T}_{(i,s),p}$ be the set of quantities collected in this way at source node s regarding path $p \in \mathcal{P}_{(i,s)}$ during a measurement period of duration T. At the end of the measurement period, s produces the estimate $q_{(i,s)}$:

$$q_{(i,s),p} = \sum_{t \in \mathcal{T}_{(i,s),p}} t/T, \ i \in \mathcal{C}. \quad (38)$$

An embodiment shows that the resulting $z_v$, $q_{(i,s)}$ satisfy (33) and (34), respectively, in Lemma 6.

In the above construction, control messages are sent over all paths in $\mathcal{P}_{(i,s)}$. It is important to note however that when sent over paths p such that $\rho_{(i,s),p} \approx 0$ control messages do not travel far: the termination condition (the sum exceeding 1) is satisfied early on. Messages sent over unlikely paths are thus pruned early, and "deep" propagation happens in very likely paths. Nevertheless, to reduce control traffic, in Section VI-G some embodiments propagate a single control message over a single path.

C. State Adaptation and Smoothening

Having estimates $Z = [z_v]_{v \in V}$, $q = [q_{(i,s)}]_{(i,s) \in \mathcal{R}}$, the global state is adapted as follows: at the conclusion of the k-th period, the new state $(\rho^{(k+1)}, \Xi^{(k+1)})$ is computed as:

$$\mathcal{P}_{\text{conv}(\mathcal{D}_{SR})}(\rho^{(k)} + \gamma_k q(\rho^{(k)}, \Xi^{(k)}), \Xi^{(k)} + \gamma_k Z(\rho^{(k)}, \Xi^{(k)})), \quad (39)$$

where $\gamma_k = 1/\sqrt{k}$ is a gain factor and $\mathcal{P}_{\text{conv}(\mathcal{D}_{SR})}$ is the orthogonal projection onto the convex set $\text{conv}(\mathcal{D}_{SR})$. Note that this additive adaptation and corresponding projection is separable across nodes and can be performed in a distributed fashion: each node $v \in V$ adapts its own relaxed caching strategy, each source s adapts its routing strategy, and nodes project these strategies to their respective local constraints implied by (10b), (10a), and the [0,1] constraints. Note that these involve projections onto the rescaled simplex, for which well-known linear methods exist [60]. Upon performing the state adaptation (39), each node $v \in V$ and each source s, for $(i,s) \in \mathcal{R}$, compute the following "sliding averages" of current and past states:

$$\bar{\xi}_v^{(k)} = \sum_{\ell=\lfloor k/2 \rfloor}^{k} \gamma_\ell \xi_v^{(\ell)} \bigg/ \left[\sum_{\ell=\lfloor k/2 \rfloor}^{k} \gamma_\ell\right]. \quad (40)$$

$$\bar{\rho}_s^{(k)} = \sum_{\ell=\lfloor \frac{k}{2} \rfloor}^{k} \gamma_\ell \rho_v^{(\ell)} \bigg/ \left[ \sum_{\ell=\lfloor \frac{k}{2} \rfloor}^{k} \gamma_\ell \right]. \quad (41)$$

This is necessary because of the non-differentiability of $L_{SR}$ [61]. Note that $(\bar{\rho}^{(k)}, \bar{\Xi}^{(k)}) \in \text{conv}(\mathcal{D}_{SR})$, as a convex combination of elements of $\text{conv}(\mathcal{D}_{SR})$.

D. Randomized Caching and Routing

The resulting $(\bar{\rho}^{(k)}, \bar{\Xi}^{(k)})$ determine the randomized routing and caching strategies at each node during a timeslot. First, given $\bar{\rho}^{(k)}$, each time a request $(i,s)$ is generated, path $p \in \mathcal{P}_{(i,s)}$ is used to route the request with probability $\bar{\rho}_{(i,s),p}$, independently of past routing and caching decisions. Second, given $\bar{\xi}_v^{(k)}$, each node $v \in V$ reshuffles its contents, placing items in its cache independently of other nodes: that is, node v selects a random strategy $x_v^{(k)} \in \{0,1\}^{|\mathcal{C}|}$ sampled independently of any other node in V.

The random strategy $x_v^{(k)}$ satisfies the following two properties: (a) it is a feasible strategy, i.e., satisfies the capacity and integrality constraints (10a) and (10c), and (b) it is consistent with the marginals $\bar{\xi}_v(k)$, i.e., for all $i \in C$, $\mathbb{E}[x_{vi}^{(k)} | \bar{\xi}_v^{(k)}] = \bar{\xi}_{vi}^{(k)}$. There can be many random caching strategies whose distributions satisfy the above two properties. An efficient method generating such a distribution is provided in [20] and, independently, in [56]. Given $\bar{\xi}_v^{(k)}$, a distribution over (deterministic) caching strategies can be computed in $O(c_v|C|\log|C|)$ time, and has $O(|C|)$ support; for the sake of completeness, some embodiments outline this below. Some embodiments follow the high-level description of [56] here; a detailed, formal description of the method, a proof of its correctness, and a computational complexity analysis, can be found in [20].

Figure 4:
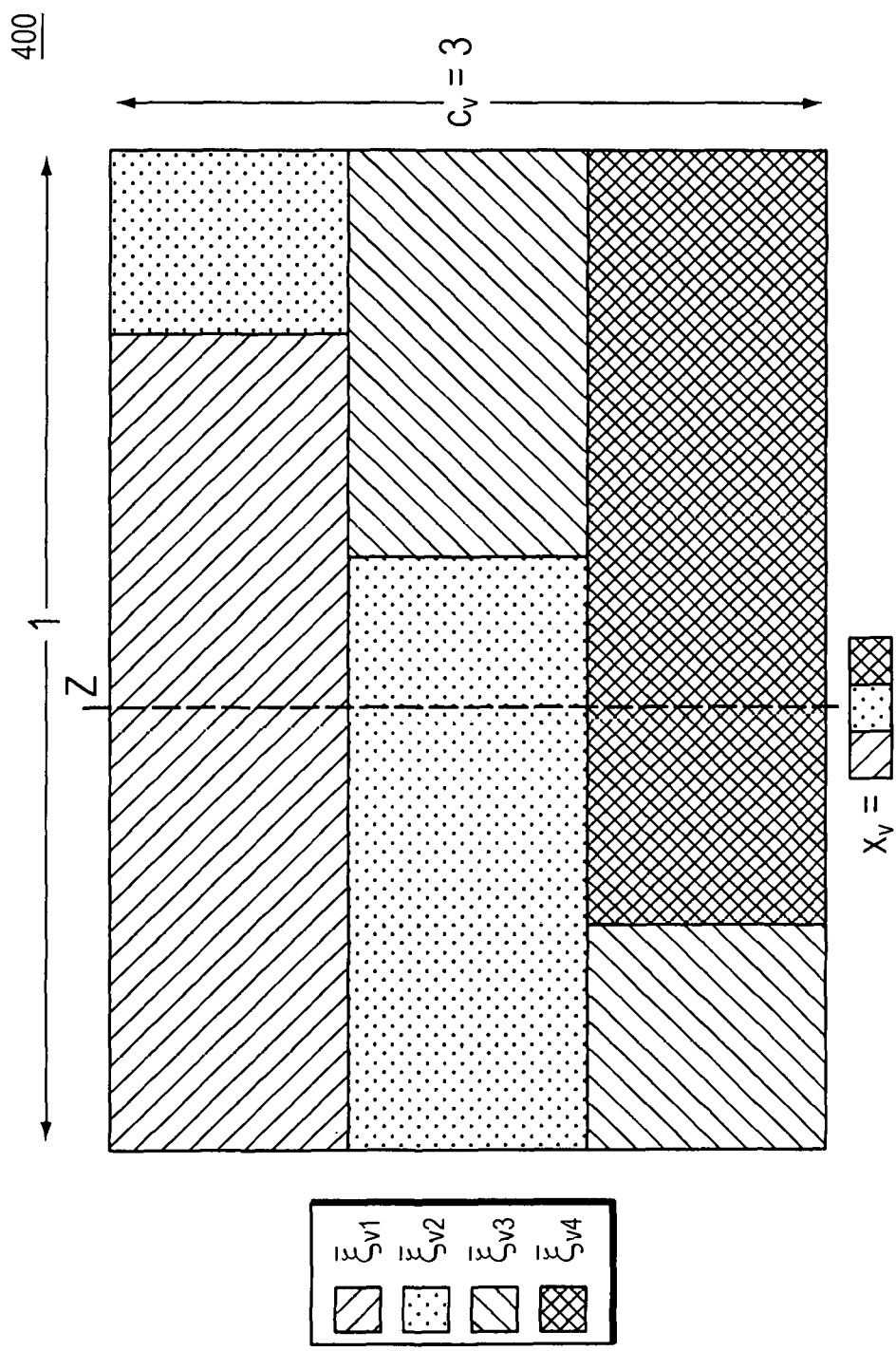
FIG. 4 illustrates a caching strategy, according to some embodiments.

The input to the method are the marginal probabilities $\bar{\xi}_{vi} \in [0,1]$, $i \in C$ such that $\Sigma_{i \in C} \bar{\xi}_{vi} = c_v$, where $c_v \in \mathbb{N}$ is the capacity of cache v. To construct a randomized caching strategy with the desired marginal distribution, consider a rectangle box of area $c_v \times 1$, as illustrated in FIG. 4. FIG. 4 illustrates a caching strategy, according to some embodiments.

According to some embodiments, FIG. 4 illustrates construction of a feasible randomized caching strategy $x_v$ (element 400) that satisfies marginals $P[x_{vi}=1] = \bar{\xi}_{vi}$, where $\Sigma_{i \in C} \bar{\xi}_{vi} = c_v$. In this example, $c_v = 3$, and $C = \{1,2,3,4\}$. Given $\bar{\xi}_v$, rectangles of height 1 each are constructed, such that the i-th rectangle has length $\bar{\xi}_{vi} \in [0,1]$, and the total length is $c_v$. After placing the 4 rectangles in a 3×1 box, cutting the box at z selected u.a.r. from [0,1], and constructing a triplet of items from the rectangles it intersects, leads to an integral caching strategy with the desired marginals.

For each $i \in C$, place a rectangle of length $\bar{\xi}_{vi}$ and height 1 inside the box, starting from the top left corner. If a rectangle does not fit in a row, cut it, and place the remainder in the row immediately below, starting again from the left. As $\Sigma_{i \in C} \bar{\xi}_{vi} = c_v$, this space-filling method tessellates the $c_v \times 1$ box. The randomized placement then is constructed as follows: select a value in $z \in [0,1]$ uniformly at random, and "cut" the box at position z. The value intersects exactly $c_v$ distinct rectangles: as $\bar{\xi}_{vi} \leq 1$, no rectangle "overlaps" with itself. The method then produces as output the caching strategy $x_v \in \{0,1\}^{|C|}$ where:

$$x_{vi} = \begin{cases} 1, & \text{if the line intersects rectangle } i, \\ 0, & o.w. \end{cases}$$

| Method 2 - Projected Gradient Ascent |
| --- |
| 1: Execute the following for each $v \in V$ and each $(i, s) \in \mathcal{R}$: |
| 2: Pick arbitrary state $(\rho^{(0)}, \Xi^{(0)}) \in \text{conv}(\mathcal{D}_{SR})$. |
| 3: for each timeslot $k \geq 1$ do |
| 4:   for each $v \in V$ do |
| 5:     Compute the sliding average $\bar{\xi}_v^{(k)}$ through (40). |
| 6:     Sample a feasible $x_v^{(k)}$ from a distribution with marginals $\bar{\xi}_v^{(k)}$. |
| 7:     Place items $x_v^{(k)}$ in cache. |
| 8:     Collect measurements and, at the end of the timeslot, compute estimate $z_v$ f $\partial_{\xi_v} L_{SR}(\rho^k, \Xi^{(k)})$ through (37). |
| 9:     Adapt $\bar{\xi}_v^{(k)}$ through (39) to new state $\bar{\xi}_v^{(k+1)}$ in the direction of the gradient with step-size $\gamma_k$, projecting back to $\text{conv}(\mathcal{D}_{SR})$. |
| 10:   end for |
| 11:   for each $(i, s) \in \mathcal{R}$ do |
| 12:     Compute the sliding average $\bar{\rho}_{(i,s)}^{(k)}$ through (41). |
| 13:     Whenever a new request arrives, sample $p \in P_{(i,s)}$ from distribution $\bar{\rho}_{(i,s)}^{(k)}$. |
| 14:     Collect measurements and, at the end of the timeslot, compute estimate $q_{(i,s)}$ of $\partial_{\rho(i,s)} L_{SR}(\rho^k, \Xi^{(k)})$ through (38). |
| 15:     Adapt $\rho_{(i,s)}^{(k)}$ through (39). to new state $\rho_{(i,s)}^{(k+1)}$ in the direction of the gradient with step-size $\gamma_k$, projecting back to $\text{conv}(\mathcal{D}_{SR})$. |
| 16:   end for |
| 17: end for |

As the line intersects $c_v$ distinct rectangles, $\Sigma_{i \in C} x_{vi} = c_v$, so the caching strategy is indeed feasible. On the other hand, by construction, the probability that $x_{vi}=1$ is exactly equal to the length of the i-th rectangle, so the marginal probability that i is placed in the cache is indeed $P[x_{vi}=1] = \bar{\xi}_{vi}$, and the randomized cache strategy $x_v$ has the desired marginals.

E. Proof of Lemma 5

Some embodiments show that (37) and (38) are unbiased estimators of the subgradient:

Lemma 6

The vectors $z_v$, $v \in V$, and $q_{(i,s)}$, $(i,s) \in \mathcal{R}$ constructed through coordinates (37) and (38), satisfy:

$$\mathbb{E}[z_v] \in \partial_{\xi_v} L_{SR}(\rho, \Xi), \text{ and } \mathbb{E}[q_{(i,s)}] \in \partial_{\xi_v} L_{SR}(\rho, \Xi).$$

Moreover, $\mathbb{E}[\|z_v\|_2^2] \leq C_1$, and $\mathbb{E}[\|q_{(i,s)}\|_2^2] \leq C_2$, where $$C_1 = W^2 \overline{P}^2 |V|^2 |C| \left( \Lambda^2 + \frac{\Lambda}{T} \right),$$

$$C_2 = W^2 |V|^2 P \left( \Lambda^2 + \frac{\Lambda}{T} \right),$$

and constants $W$, $\overline{P}$, and $\Lambda$ are given by:

$$W = \max_{(i,j) \in E} w_{ij},$$

$$\overline{P} = \max_{(i,s) \in \mathcal{R}} |\mathcal{P}_{(i,s)}|, \text{ and}$$

$$\Lambda = \sum_{(i,s) \in \mathcal{R}} \lambda_{(i,s)}.$$

Proof:

A vector $\zeta \in \mathbb{R}^{|C|}$ belongs to $\theta_{\xi_v} L_{SR}(\rho, \Xi)$ if and only if $\zeta_i \in [\underline{\partial_{\xi_{vi}} L_{SR}}(\rho, \Xi), \overline{\partial_{\xi_{vi}} L_{SR}}(\mu, \Xi)]$, where:

$$\overline{\partial_{\xi_{vi}} L_{SR}}(\rho, \Xi) =$$

$$\sum_{(i,s) \in \mathcal{R}} \lambda_{(i,s)} \sum_{p \in \mathcal{P}_{(i,s)}} \mathbb{1}_{v \in p} \cdot \sum_{k'=k_p(v)}^{|p|-1} w_{p_{k'}+i p_{k'}} \mathbb{1}_{1-\rho(i,s)+\sum_{\ell=i}^{k'} \xi_{p_\ell^i} \leq 1},$$

$$\underline{\partial_{\xi_{vi}} L_{SR}}(\rho, \Xi) =$$

$$\sum_{(i,s) \in \mathcal{R}} \lambda_{(i,s)} \sum_{p \in \mathcal{P}_{(i,s)}} \mathbb{1}_{v \in p} \cdot \sum_{k'=k_p(v)}^{|p|-1} w_{p_{k'}+i p_{k'}} \mathbb{1}_{1-\rho(i,s)+\sum_{\ell=i}^{k'} \xi_{p_\ell^i} < 1}.$$

If $L_{SR}$ is differentiable at $(\rho, \Xi)$ w.r.t $\xi_{vi}$, the two limits coincide and are equal to $$\frac{\partial L_{SR}}{\partial_{vi}}.$$

It immediately follows from the fact that requests are Poisson that $\mathbb{E}[z_{vi}(\rho, \Xi)] = \overline{\partial_{\xi_{vi}} L_{SR}}(\rho, \Xi)$, so indeed $\mathbb{E}[z_v(Y)] \in \partial_{\xi_v} L_{SR}(\rho, \Xi)$. To prove the bound on the second moment, note that, for $T_{vi}$ the number of requests generated for $i$ that pass through $v$ during the slot, $$\mathbb{E}[z_{vi}^2] = \frac{1}{T^2} \mathbb{E}\left[\left(\sum_{t \in T_{vi}} t\right)^2\right] \leq \frac{W^2 \overline{P}^2 |V|^2}{T^2} \mathbb{E}[T_{vi}^2],$$

as $t \leq W \overline{P} |V|$. On the other hand, $T_{vi}$ is Poisson distributed with expectation $$\sum_{(i,s) \in \mathcal{R}} \mathbb{1}_{\exists p \in \mathcal{P}_{(i,s)} \text{ such that } v \in p} \lambda_{(i,s)} T,$$

and the upper bound follows. The statement for $q_{(i,s)}$ follows similarly.

Some embodiments now establish the convergence of the smoothened marginals to a global maximizer of $L$. Under (39), (40) and (41), from Theorem 14.1.1, page 215 of Nemirofski [61], some embodiments have that $$\varepsilon_k \leq \frac{D^2 + M^2 \sum_{\ell=\lfloor k/2 \rfloor}^{k} \gamma_\ell^2}{2 \sum_{\ell=\lfloor k/2 \rfloor}^{k} \gamma_\ell}.$$

where $\gamma_k = \frac{1}{\sqrt{k}}$, $$D \equiv \max_{x,y \in \text{conv}(\mathcal{D}_{SR})} \|x - y\|_2 = \sqrt{|V| \max_v 2 c_v + 2|\mathcal{R}|},$$

and $$M \equiv \sup_{(\rho, \Xi)} \sqrt{\mathbb{E}[\|Z(\rho, \Xi)\|_2^2] + \mathbb{E}[\|q(\rho, \Xi)\|_2^2]}.$$

From Lem. 6, $M \leq \sqrt{|V| C_1 + |\mathcal{R}| C_2}$, and Lemma 5 follows.

F. Proof of Theorem 4

By construction, conditioned on $(\overline{\rho}^{(k)}, \overline{\Xi}^{(k)})$, the $|V| + |\mathcal{R}|$ variables $x_v$, $v \in V$, and $r_{(i,s)}$, $(i,s)$, are independent. Hence, conditioned on $(\overline{\rho}^{(k)}, \overline{\Xi}^{(k)})$, all monomial terms of $F_{SR}$ involve independent random variables. Hence, $$\mathbb{E}[F_{SR}(r^{(k)}, X^{(k)}) | \overline{\rho}^{(k)}, \overline{\Xi}^{(k)}] = F_{SR}(\overline{\rho}^{(k)}, \overline{\Xi}^{(k)}),$$

and, in turn, $$\lim_{k \to \infty} \mathbb{E}[F_{SR}(r^{(k)}, X^{(k)})] = \lim_{k \to \infty} \mathbb{E}[F_{SR}(\overline{\rho}^{(k)}, \overline{\Xi}^{(k)})].$$

Lemma 5 implies that, for $v^{(k)}$ the distribution of $(\overline{\rho}^{(k)}, \overline{\Xi}^{(k)})$, and $\Omega$ the set of $(\rho^*, \Xi^*) \in \text{conv}(\mathcal{D}_{SR})$ that are maximizers of $L_{SR}$, $$\lim_{k \to \infty} v^{(k)}(\text{conv}(\mathcal{D}_{SR}) \setminus \Omega) = 0.$$

By Lemma 2, $F_{SR}(\rho^*, \Xi^*) \geq (1 - 1/e) \max_{(r,X) \in \mathcal{D}_{SR}} F_{SR}(r, X)$, for any $(\rho^*, \Xi^*) \in \Omega$. The theorem follows from the above observations, and the fact that $F_{SR}$ is bounded in $\text{conv}(\mathcal{D}_{SR}) \setminus \Omega$.

G. Reducing Control Traffic.

Control messages generated by the protocol can be reduced by modifying the method to propagate a single control message over a single path with each request. The path is selected uniformly at random over paths in the support of $\rho_{(i,s)}$. That is, when a request $(i,s) \in \mathcal{R}$ arrives at $s$, a single control message is propagated over $p$ selected uniformly at random from $\text{supp}(\rho_{(i,s)}) = \{p \in \mathcal{P}_{(i,s)} : \rho_{(i,s),p} > 0\}$. This reduces the number of control messages generated by $s$ by at least a $c = |\text{supp}(\rho_{(i,s)})|$ factor. To ensure that (33) and (34) hold, it suffices to rescale measured upstream costs by $c$. To do this, the (single) control message contains an additional field storing $c$. When extracting weight counters from downwards packets, nodes on the path compute $t'_{vi} = c \cdot t_{vi}$, and $t'_{(i,s),p} = c \cdot t_{(i,s),p}$, where $t_{vi}$, $t_{(i,s),p}$ are as in (35) and (36), respectively. This randomization reduces control traffic, but increases the variance of subgradient estimates, also by a factor of $c$. This, in turn, slows down the method convergence; this tradeoff can be quantified through, e.g., the constants in Lemma 5.

VII. Hop-by-Hop Routing

The proofs for the hop-by-hop setting are similar, mutatis-mutandis, as the proofs of the source routing setting. As such, in the exposition below, some embodiments focus on the main technical differences between the methods for the two settings.

Offline Setting.

Define the constant:

$$C_{HH}^0 = \Sigma_{(i,s) \in \mathcal{R}} \lambda_{(i,s)} \Sigma_{(u,v) \in G^{(i,s)}} w_{vu} |\mathcal{P}_{(i,s)}^u|.$$

Using this constant, some embodiments define the caching gain maximization problem to be:

MAXCG-HH

Maximize $F_{HH}(r, X)$ (42a)

subj. to: $(r, X) \in \mathcal{D}_{HH}$ (42b)

where $F_{HH}(r,X) = C_{HH}^0 - \Sigma_{(i,s) \in \mathcal{R}} \lambda_{(i,s)} C_{HH}^{(i,s)}(r,X)$ is the expected caching gain. This is again an NP-hard problem, equivalent to (12). Embodiments can again construct a constant approximation method for MAXCG-HH Theorem 5:

There exists an method that terminates within a number of steps that is polynomial in $|V|$, $|C|$, and $P_{HH}$, and produces a strategy $(r',X') \in \mathcal{D}_{HH}$ such that $$F_{HH}(r', X') \geq (1 - 1/e) \max_{(r,X) \in \mathcal{D}_{HH}} F_{HH}(r, X).$$

Proof:
Consider the function $$L_{HH}(\rho, \Xi) = \sum_{(i,s) \in \mathcal{R}} \lambda_{(i,s)} \sum_{(u,v) \in G^{(i,s)}} \sum_{p \in \mathcal{P}_{(i,s)}^u} w_{vu} \cdot$$

$$\min\left\{1, 1 - \rho_{uv}^{(i)} + \xi_{ui} + \sum_{k'=1}^{|p|-1} \left(1 - \rho_{p_{k'}p_{k'+1}}^{(i)} + \xi_{p_{k'}i}\right)\right\}.$$

As in Lemma 2, embodiments can show that this concave function approximates $F_{HH}$, in that for all $(\rho,\Xi) \in \text{conv}(\mathcal{D}_{HH})$:

$(1-1/e)L_{HH}(\rho,\Xi) \leq F_{HH}(\rho,\Xi) \leq L_{HH}(\rho,\Xi).$

To construct a constant approximation solution, first, a fractional solution $$(\rho^*, \Xi^*) = \underset{(\rho,\Xi) \in \text{conv}(\mathcal{D}_{HH})}{\text{argmax}} L_{HH}(\rho, \Xi),$$

can be obtained. This again involves a convex optimization, which can be reduced to a linear program. Subsequently, the solution can be rounded to obtain an integral solution $(r,X) \in \mathcal{D}_{SR}$ such that $F_{HH}(r,X) \geq F_{HH}(\rho^*,\Xi^*)$. Rounding $\Xi^*$ follows the same steps as for source routing. To round $\rho^*$, one first rounds each node's strategy individually, i.e., for every $v \in V$ and every $i \in C$, some embodiments may pick the neighbor that maximizes the objective. This again follows from the fact that, given a caching strategy $\Xi$, and given the routing strategies of other nodes, $F_{HH}$ is an affine function of $\{r_{uv}^{(i)}\}_{v:(uv) \in E^{(i)}}$, for $u \in V$, with positive coefficients. Hence, keeping everything else fixed, if each node chooses a cost minimizing decision, this rounds its strategy, and nodes in V can do this sequentially. The DAG property ensures that all requests eventually reach a designated server, irrespectively of the routing strategies resulting from the rounding decisions.

Online Setting.

Finally, as in the case of source routing, embodiments can provide a distributed, adaptive method for hop-by-hop routing as well.

Theorem 6:

There exists a distributed, adaptive method under which the randomized strategies sampled during the k-th slot $(r^{(k)}, X^{(k)}) \in \mathcal{D}_{HH}$ satisfy $$\lim_{k \to \infty} \mathbb{E}[F_{HH}(r^{(k)}, X^{(k)})] \geq (1 - 1/e) \max_{(r,X) \in \mathcal{D}_{SR}} F_{HH}(r, X).$$

Proof:

A distributed method can be constructed by performing projected gradient ascent over $L_{HH}$. Beyond the same caching state variables $\xi_v$ stored at each node $v \in V$, each node $v \in V$ maintains routing state variables $$\rho_u^{(i)} = [\rho_{uv}^{(i)}]_{v:(u,v) \in E^{(i)}} \in [0,1]^{|E^{(i)}|},$$

for each $i \in C$, containing the marginal probabilities $\rho_{uv}^{(i)}$ that u routes request message for item i towards $v \in E^{(i)}$. Time is slotted, and nodes perform subgradient estimation, state adaptation, state smoothening, and randomized sampling of caching and routing strategies. As the last three steps are nearly identical to source routing, some embodiments focus below on how to estimate subgradients, which is the key difference between the two methods.

Whenever a request $(i,s) \in \mathcal{R}$ is generated, a control message is propagated in all neighbors of s in $E^{(i)}$. These messages contain counters initialized to $1-\rho_{sv}^{(i)}+\xi_{si}$. Each node $v \in V$ receiving such a message generates one copy for each of its neighbors in $E^{(i)}$. For each neighbor u, v adds $1-\rho_{vu}^{(i)}+\xi_{vi}$ to the counter, and forwards the message to u if the counter is below 1.0. Formally, a control message originating at s and reaching a node v after having followed path $p \in G^{(i,s)}$ is forwarded to u if the following condition is satisfied:

$1-\rho_{vu}^{(i)}+\xi_{ui}+\Sigma_{\ell=1}^{k_p(v)-1}(1-\rho_{p_\ell p_{\ell+1}}^{(i)}+\xi_{p_\ell i}) \leq 1.$ If this condition is met, v forwards a copy of the control message to u; the above process is repeated at each of each neighbors. If the condition fails for all neighbors, a response message is generated by v and propagated over the reverse path, accumulating the weights of edges it passes through. Moreover, descending control messages are merged as follows. Each node v waits for all responses from neighbors to which it has sent control messages; upon the last arrival, it adds their counters, and sends the "merged" message containing the accumulated counter reversely over path p.

As before, messages on the return path are again "sniffed" by nodes they pass through, extracting the upstream costs. Their averages are used as estimators of the subgradients w.r.t. both the local routing and caching states, in a manner similar to how this was performed in source routing. As each edge is traversed at most twice, the maximum number of control messages is $O(|E^{(i)}|)$. As in the case of source routing, however, messages on low-probability paths are pruned early. Moreover, as in Section VI-G, only a single message may be propagated to a neighbor selected uniformly at random; in this case, the message may also contain a field keeping track of the product of the size of neighborhoods of nodes it has passed through, and updated by each node by multiplying the entry by the size of its own neighborhood. As in source routing, this is used as an additional scaling factor for quantities $t_{vu}^{(i)}$, $t_{vi}$.

Some embodiments note again that the distributed, adaptive method attains an expected caching gain within a constant approximation from the offline optimal.

VIII. Evaluation

Some embodiments simulate Method 2 over both synthetic and real networks. Some embodiments compare its performance to traditional caching policies, combined with both static and dynamic multi-path routing.

Figure 5:
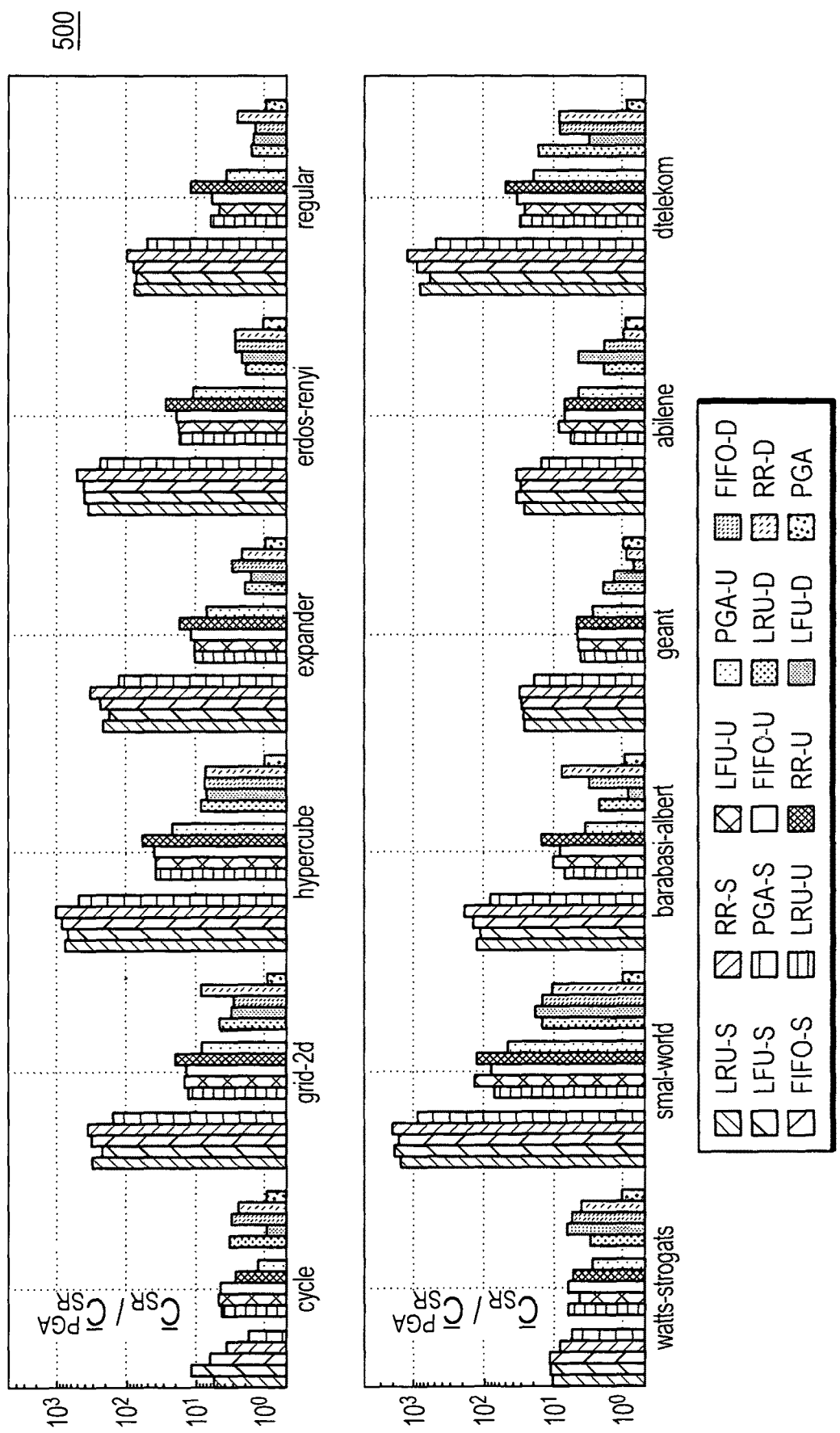
FIG. 5 illustrates ratio of expecting routing costs, for different topologies and strategies, according to some embodiments.

FIG. 5 illustrates corresponding results 500 of this simulation, including a ratio of expecting routing costs, for different topologies and strategies, according to some embodiments. According to some embodiments, FIG. 5 illustrates 500 a ratio of expected routing cost $\overline{C}_{SR}$ to routing cost $\overline{C}_{SR}SR^{PGA}$ under the PGA policy, for different topologies and strategies. For each topology, each of the three groups of bars corresponds to a routing strategy, namely, RNS/shortest path routing (-S), uniform routing (-U), and dynamic routing (-D). The method presented in [20] is PGA-S, while the method (PGA), with ratio 1.0, is shown last for reference purposes; values of of $\overline{C}_{SR}PGA$ are given in Table II to follow.

Experiment Setup.

Some embodiments consider the topologies in Table II. For each graph G(V,E), some embodiments generate a catalog of size |C|, and assign to each node v∈V a cache of capacity $c_v$. For every item i∈C, some embodiments designate a node selected uniformly at random (abbreviated as "u.a.r." herein) from V as a designated server for this item; the item is stored outside the designate server's cache. Some embodiments assign a weight to each edge in E selected u.a.r. from the interval [1,100]. Some embodiments also select a random set of Q nodes as the possible request sources, and generate a set of requests $\mathcal{R} \subseteq C \times V$ by sampling exactly $|\mathcal{R}|$ from the set C×Q, uniformly at random. For each such request $(i,s) \in \mathcal{R}$, some embodiments select the request rate $\lambda_{(i,s)}$ according to a Zipf distribution (known as "Zipf's law" or a Zipfian distribution to one skilled in the art) with parameter 1.2; these are normalized so that average request rate over all |Q| sources is 1 request per time unit. For each request $(i,s) \in \mathcal{R}$, some embodiments generate $|\mathcal{P}_{(i,s)}|$ paths from the source s∈V to the designated server of item i∈C. This path set includes the shortest path to the designated server. Some embodiments consider only paths with stretch at most 4.0; that is, the maximum cost of a path in $P_{(i,s)}$ is at most 4 times the cost of the shortest path to the designated source. The values of |C|, $|\mathcal{R}|$ |Q|, $c_v$, and $\mathcal{P}_{(i,s)}$ for each G are given in Table II.

Online Caching and Routing Methods.

Some embodiments compare the performance of the joint caching and routing projected gradient ascent method (PGA) to several competitors. In terms of caching, some embodiments consider four traditional eviction policies for comparison: Least-Recently-Used (LRU), Least-Frequently-Used (LFU), First-In-First-Out (FIFO), and Random Replacement (RR). Some embodiments combine these policies with path-replication [2],[12]: once a request for an item reaches a cache that stores the item, every cache in the reverse path on the way to the query source stores the item, evicting stale items using one of the above eviction policies. Some embodiments combine the above caching policies with three different routing policies. In route-to-nearest-server (-S), only the shortest path to the nearest designated server is used to route the message. In uniform routing (-U), the source s routes each request (i,s) on a path selected uniformly at random among all paths in $\mathcal{P}_{(i,s)}$. Some embodiments combine each of these (static) routing strategies with each of the above caching strategies use. For instance, LRU-U indicates LRU evictions combined with uniform routing. Note that PGA-S, i.e., the method restricted to RNS routing, is exactly the single-path routing method proposed in [20]. To move beyond static routing policies for LRU, LFU, FIFO, and RR, some embodiments also combine the above traditional caching strategies with an adaptive routing strategy, akin to the method, with estimates of the expected routing cost at each path used to adapt routing strategies. During a slot, each source node s maintains an average of the routing cost incurred when routing a request over each path. At the end of the slot, the source decreases the probability $\rho_{(i,s),p}$ that it follows the path p by an amount proportional to the average, and projects the new strategy to the simplex. For fixed caching strategies, this dynamic routing method converges to a route-to-nearest-replica (RNS) routing, which some embodiments expect by Corollary 1 to have good performance. Some embodiments denote this routing method with the extension "-D". Note that some embodiments are simulated online.

Experiments and Measurements.

Each experiment consists of a simulation of the caching and routing policy, over a specific topology, for a total of 5000 time units. To leverage PASTA, some embodiments collect measurements during the duration of the execution at exponentially distributed intervals with mean 1.0 time unit. At each measurement epoch, some embodiments extract the current cache contents in the network and construct $X \in \{0,1\}^{|V| \times |C|}$. Similarly, some embodiments extract the current routing strategies $\rho_{(i,s)}$ for all requests $(i,s) \in \mathcal{R}$, and construct the global routing strategy $p \in [0,1]^{SR}$. Then, some embodiments evaluate the expected routing cost $C_{SR}(\rho, X)$. Some embodiments report the average $C_{SR}$ of these values across measurements collected after a warmup phase, during 1000 and 5000 time units of the simulation; that is, if $t_i$ are the measurement times, then $$\overline{C}_{SR} = \frac{1}{t_{tot} - t_w} \sum_{t_i : \in [t_w, t_{tot}]} C_{SR}(\rho(t_i), X(t_i)).$$

Performance w.r.t Routing Costs.

The relative performance of the different strategies to the method is shown in FIG. 5. With the exception of cycle and watts-strogatz, where paths are scarce, some embodiments see several common trends across topologies. First, simply moving from RNS routing to uniform, multi-path routing, reduces the routing cost by a factor of 10. Even without optimizing routing or caching, simply increasing path options increases the available caching capacity. For caching policies, optimizing routing through the dynamic routing policy (denoted by -D), reduces routing costs by another factor of 10. Finally, jointly optimizing routing and caching leads to a reduction by an additional factor between 2 and 10 times. In several cases, PGA outperforms RNS routing (including [20]) by 3 orders of magnitude.

Convergence.

In Table II, an embodiment shows the convergence time for different variants of LRU and PGA. Some embodiments define the convergence time to be the time at which the time-average caching gain reaches 95% of the expected caching gain attained at steady state. LRU converges faster than PGA, though it converges to a sub-optimal stationary distribution. Interestingly, both -U and adaptive routing reduce convergence times for PGA, in some cases (like grid-2d and dtelekom) to the order of magnitude of LRU: this is because path diversification reduces contention: it assigns contents to non-overlapping caches, which are populated quickly with distinct contents.

The client computer(s)/devices 50 (e.g., computing devices/display devices) can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, BLUETOOTH™, etc.) to communicate with one another. Other electronic device/computer network architectures are suitable. According to some embodiments, caching and routing may be performed centrally, or in distributed locations (i.e., at each network node).

TABLE II

GRAPH TOPOLOGIES, EXPERIMENT PARAMETERS, AND CONVERGENCE TIMES

| Graph | $|V|$ | $|E|$ | $|C|$ | $|R|$ | $|Q|$ | $c_r$ | $|P_{(i,s)}|$ | $C_{SR}^{PGA}$ | LRU-S | PGA-S | LRU-U | PGA-U | LRU | PGA |
|---|---|---|---|---|---|---|---|---|---|---|---|---|---|---|
| cycle | 30 | 60 | 10 | 100 | 10 | 2 | 2 | 20.17 | 0.47 | 865.29 | 0.47 | 436.14 | 6.62 | 148.20 |
| grid-2d | 100 | 360 | 300 | 1K | 20 | 3 | 30 | 0.228 | 0.08 | 657.84 | 0.08 | 0.08 | 0.08 | 0.08 |
| hypercube | 128 | 896 | 300 | 1K | 20 | 3 | 30 | 0.028 | 0.21 | 924.75 | 0.21 | 0.21 | 0.21 | 0.21 |
| expander | 100 | 716 | 300 | 1K | 20 | 3 | 30 | 0.112 | 0.38 | 794.27 | 0.38 | 0.38 | 0.38 | 0.38 |
| erdos-renyi | 100 | 1042 | 300 | 1K | 20 | 3 | 30 | 0.047 | 3.08 | 870.84 | 0.25 | 0.25 | 0.25 | 0.25 |
| regular | 100 | 300 | 300 | 1K | 20 | 3 | 30 | 0.762 | 1.50 | 1183.97 | 0.05 | 8.52 | 0.05 | 11.49 |
| watts-strogatz | 100 | 400 | 300 | 1K | 20 | 3 | 2 | 35.08 | 11.88 | 158.39 | 7.80 | 54.90 | 19.22 | 37.05 |
| small-world | 100 | 491 | 300 | 1K | 20 | 3 | 30 | 0.029 | 0.30 | 955.48 | 0.30 | 0.30 | 0.30 | 0.30 |
| barabasi-albert | 100 | 768 | 300 | 1K | 20 | 3 | 30 | 0.187 | 1.28 | 1126.24 | 1.28 | 6.86 | 1.28 | 7.58 |
| geant | 22 | 66 | 10 | 100 | 10 | 2 | 10 | 1.28 | 0.09 | 1312.96 | 1.85 | 12.71 | 0.09 | 14.41 |
| abilene | 9 | 26 | 10 | 90 | 9 | 2 | 10 | 0.911 | 3.44 | 802.66 | 3.44 | 23.08 | 5.75 | 14.36 |
| dtelekem | 68 | 546 | 300 | 1K | 20 | 3 | 30 | 0.025 | 0.30 | 927.24 | 0.30 | 0.30 | 0.30 | 0.30 |

Conclusions:

Some embodiments have constructed joint caching and routing methods with optimality guarantees for arbitrary network topologies. Identifying methods that lead to improved approximation guarantees, especially on the routing cost directly rather than on the caching gain, is an important open question. Equally important is to incorporate queuing and congestion. In particular, accounting for queueing delays and identifying delay-minimizing strategies is open even under fixed routing. Such an analysis can also potentially be used to understand how different caching and routing methods affect both delay optimality and throughput optimality. Finally, the adaptive methods proceed in a different timescale than content requests. Methods that mimic, e.g., path replication [12] may adapt faster and reduce traffic. Providing such methods with guarantees is an open problem.

Figure 6:
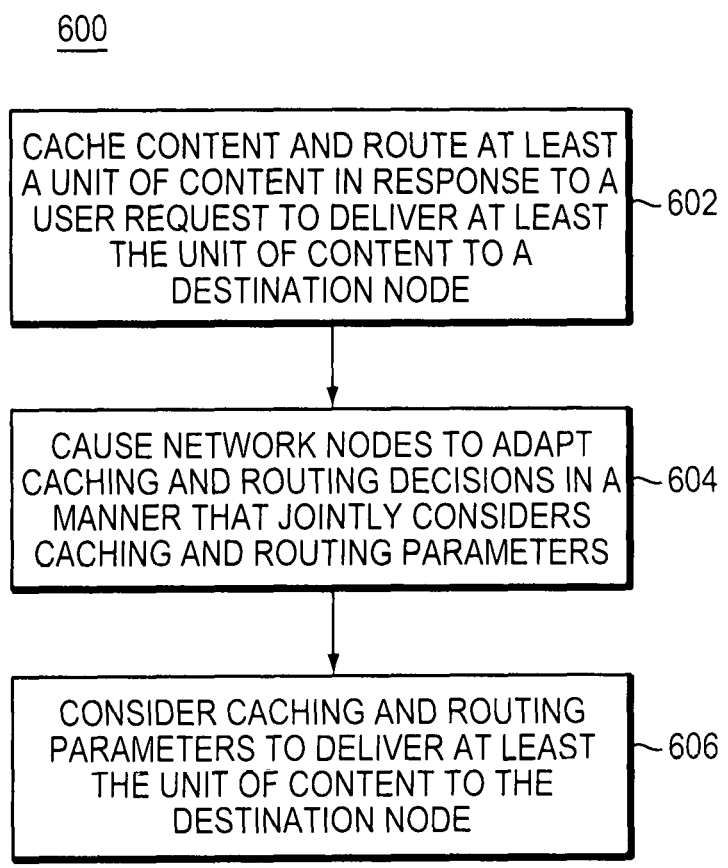
FIG. 6 is a flow diagram illustrating an example embodiment of a method of the present disclosure.

Method, Network, and System:

FIG. 6 is a flow diagram illustrating an example embodiment of a method 600 of the present disclosure. As illustrated in FIG. 6, in some embodiments, the method 600 caches content and routes a unit of content in response to a user request to deliver at least the unit of content to a destination node (602). The method 600 may cause at least a subset of the network nodes to adapt caching and routing decisions (604). The controller may be configured to cause at least the subset of the network nodes to adapt the caching and routing decisions in a manner that jointly considers caching and routing parameters to deliver at least the unit of content to the destination node (606).

Figure 7:
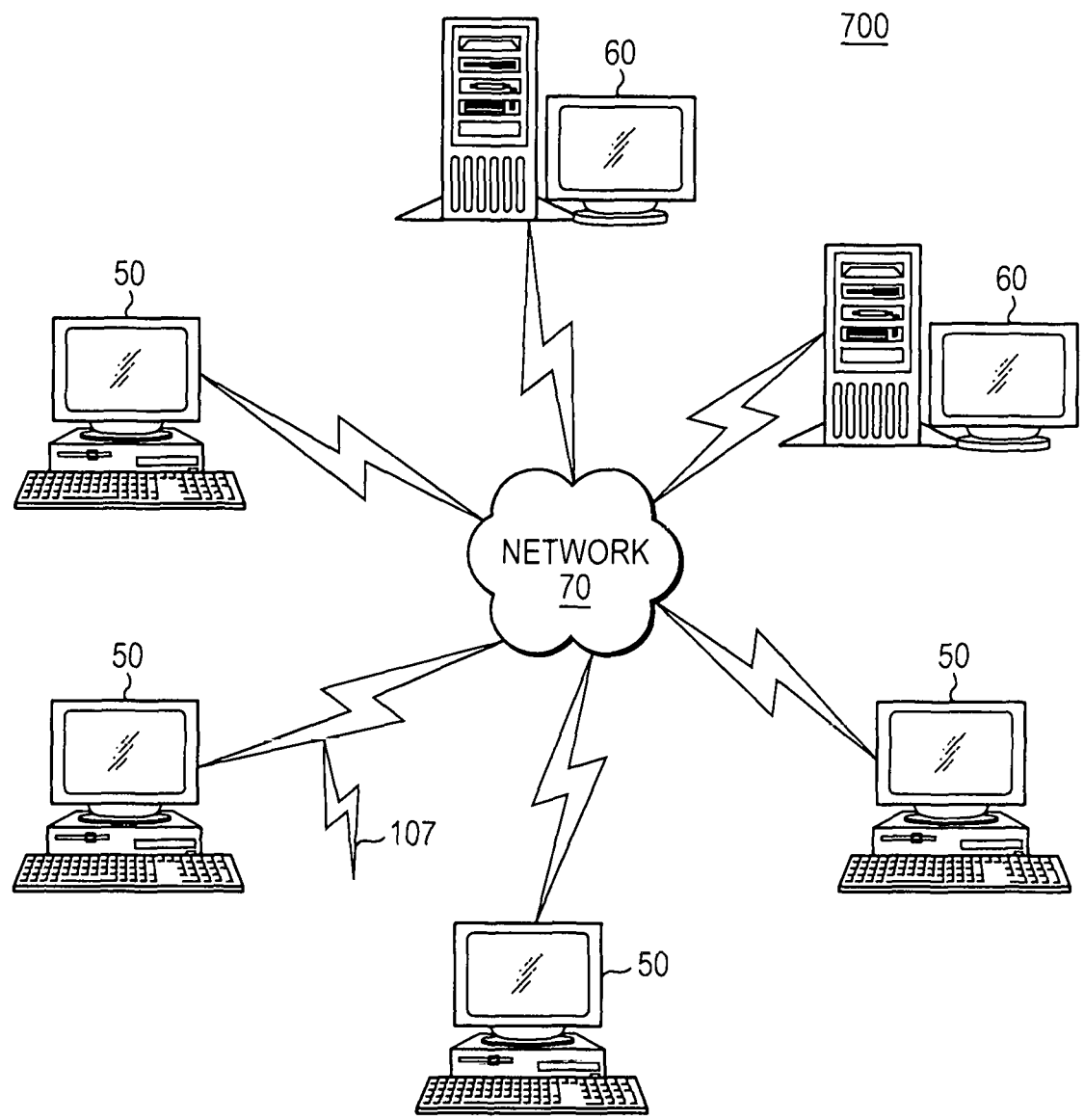
FIG. 7 is a network diagram that illustrates a computer network or similar digital processing environment in which embodiments of the present disclosure may be implemented.

FIG. 7 is a network diagram that illustrates a computer network or similar digital processing environment 800 in which embodiments of the present disclosure may be implemented. Client computer(s)/devices 50 (e.g., computing devices/display devices) and server computer(s) 60 (e.g., a Cloud-based service) provide processing, storage, and input/output devices executing application programs and the like.

Figure 8:
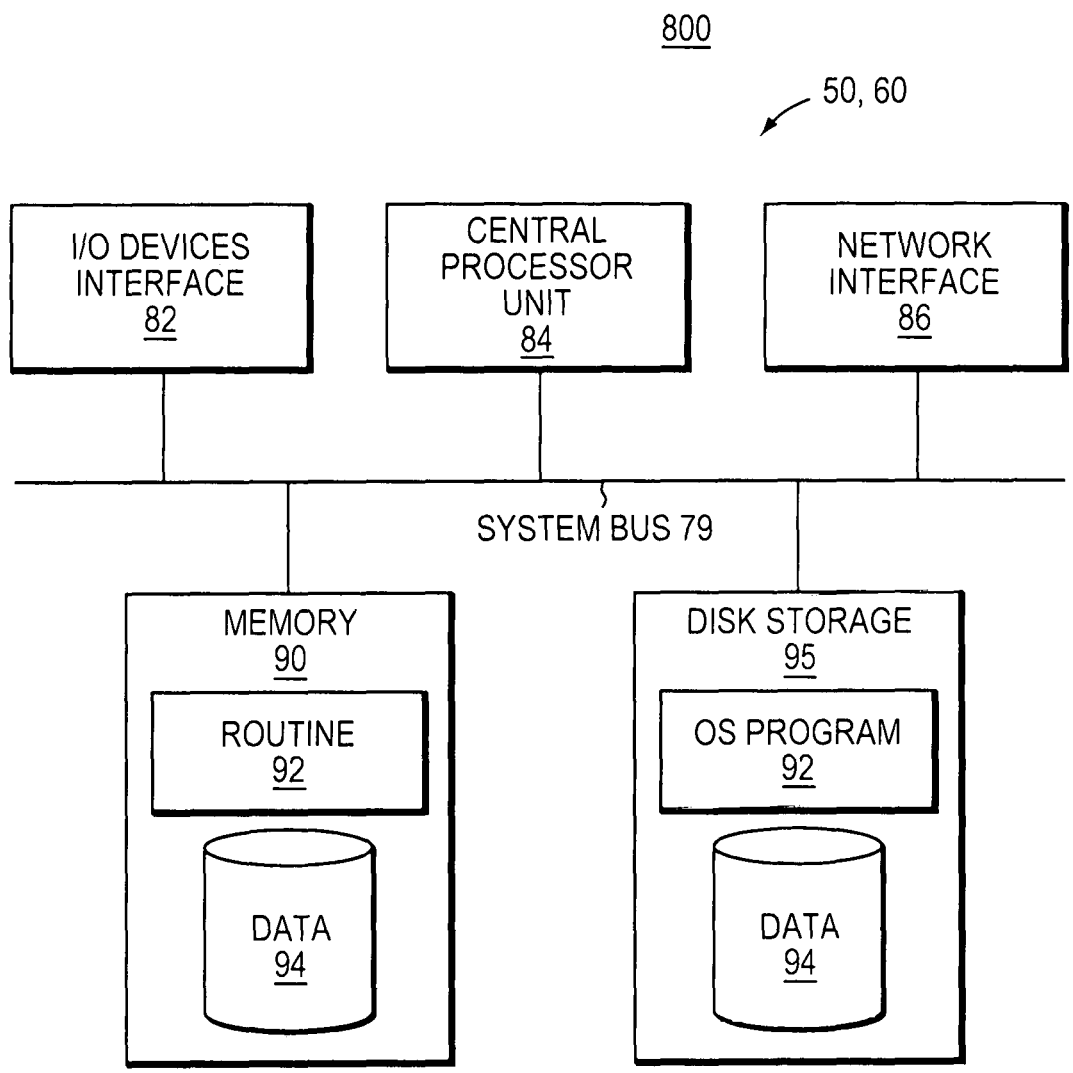
FIG. 8 is a block diagram of an example internal structure of a computer (e.g., client processor/device or server computers) in the computer system or apparatus of FIG. 7, according to some embodiments.

FIG. 8 is a block diagram of an example internal structure of a computer (e.g., client processor/device 50 or server computers 60) in the computer system or apparatus of FIG. 7. Each computer 50, 60 includes a system bus 79, where a bus is a set of hardware lines used for data transfer among the components (e.g., entities) of a computer or processing system or apparatus. The system bus 79 is essentially a shared conduit that connects different elements of a computer system or apparatus (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, touchscreen etc.) to the computer 50, 60. A network interface 86 allows the computer to connect to various other devices attached to a network (e.g., network 70 of FIG. 8). Memory 90 provides volatile storage for computer software instructions 92 and data 94 used to implement embodiments of the present disclosure (e.g., including but not limited to including any of the processor, memory, or any other device, engine, system, module, or controller described herein). Disk storage 95 provides non-volatile storage for computer software instructions 92 and data 94 used to implement some embodiments of the present disclosure. Note, data 94 may be the same between a client 50 and server 60, however, the type of computer software instructions 92 may differ between a client 50 and a server 60. A central processor unit 84 is also attached to the system bus 79 and provides for the execution of computer instructions.

As illustrated in FIG. 8, in an embodiment, the system or apparatus 800 includes a processor 84 and a memory 90 with computer code instructions stored therein. The memory 90 is operatively coupled to the processor 84 such that the computer code instructions configure the processor 84 to implement content delivery.

In some embodiments, the network of FIG. 7 includes network nodes 50 configured to cache content and to route a unit of content in response to a user request to deliver at least the unit of content to a destination node 60. The controller (which may be implemented as processor unit 84 of FIG. 8) may be configured to cause at least a subset of the network nodes 50 to adapt caching and routing decisions. The controller (processor unit 84 of FIG. 8) may be configured to cause at least the subset of the network nodes 50 to adapt the caching and routing decisions in a manner that jointly considers caching and routing parameters to deliver at least the unit of content to the destination node 60.

Referring back to FIG. 8, in some embodiments, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the disclosure system. Computer program product 92 may be installed by any suitable software installation procedure, as is well known in the art. In another embodiment, at least a portion of the software instructions may also be downloaded over a cable, communication or wireless connection. In other embodiments, the disclosure programs are a computer program propagated signal product 107 (shown in FIG. 7) embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present disclosure routines/program 92.

Embodiments or aspects thereof may be implemented in the form of hardware (including but not limited to hardware circuitry), firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, hardware, firmware, software, routines, or instructions may be described herein as performing certain actions or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, or some combination thereof, and, thus, the data processors described herein are intended for purposes of illustration only and not as a limitation of the embodiments.

While this disclosure has been particularly shown and described with references to example embodiments thereof, it will be understood by those skilled in the art that various changes in form and details may be made therein without departing from the scope of the disclosure encompassed by the appended claims.

Some embodiments may provide one or more technical advantages that may transform the behavior or data, provide functional improvements, or solve a technical problem. In some embodiments, technical advantages or functional improvements may include but are not limited to the improvement of making joint caching and routing decisions. Some embodiments provide a technical advantage or functional improvement in that a storage device in the network may make decisions based on packets passing through the storage device, and embodiments are adaptive, in that storage contents may automatically adapt to changes in content demand.

Embodiments provide technical advantages or functional improvements including provable optimality guarantees, e.g., attaining a cost reduction within a factor ~0.67 (but are not so limited) from the optimal cost reduction attained by existing approaches. Such embodiments herein significantly outperform exiting approaches in both caching and routing methods in evaluations over a broad array of network topologies.

Further, embodiments provide technical advantages or functional improvements that include one or more of the following features: (1) jointly determining caching and routing decisions, rather than each separately, (2) having provable guarantees in terms of cost reduction, in contrast to existing approaches, (3) are both distributed and adaptive, and (4) operating using packet information passing through network nodes.

Yet further, embodiments provide technical advantages or functional improvements in that such embodiments can directly find application in a system where content is to be placed in a network with varying demand including but not limited to (i) Content delivery networks, (ii) Information centric networks, (iii) Peer-to-peer networks, and (iv) Cloud computing.

Some embodiments solve a technical problem, thereby providing a technical effect, by one or more of the following. Some embodiments may solve a technical problem, thereby providing a technical effect, by making joint caching and routing decisions. Some embodiments solve a technical problem, thereby providing a technical effect, in that a storage device in the network may make decisions based on packets passing through the storage device, and embodiments are adaptive, in that storage contents may automatically adapt to changes in content demand.

Embodiments solve a technical problem, thereby providing a technical effect, by including provable optimality guarantees, e.g., attaining a cost reduction within a factor ~0.67 (but are not so limited) from the optimal cost reduction attained by existing approaches. Such embodiments herein significantly outperform exiting approaches in both caching and routing methods in evaluations over a broad array of network topologies.

Further, embodiments solve a technical problem, thereby providing a technical effect, by including one or more of the following features: (1) jointly determining caching and routing decisions, rather than each separately, (2) having provable guarantees in terms of cost reduction, in contrast to existing approaches, (3) are both distributed and adaptive, and (4) operating using packet information passing through network nodes.

Yet further, embodiments solve a technical problem, thereby providing a technical effect, in that such embodiments can directly find application in a system where content is to be placed in a network with varying demand including but not limited to (i) Content delivery networks, (ii) Information centric networks, (iii) Peer-to-peer networks, and (iv) Cloud computing.

REFERENCES

[1] S. Ioannidis and E. Yeh, "Jointly optimal routing and caching for arbitrary network topologies," in ACM ICN, 2017.
[2] V. Jacobson, D. K. Smetters, J. D. Thornton, M. F. Plass, N. H. Briggs, and R. L. Braynard, "Networking named content," in CoNEXT, 2009.
[3] E. Yeh, T. Ho, Y. Cui, M. Burd, R. Liu, and D. Leong, "VIP: A framework for joint dynamic forwarding and caching in named data networks," in ICN, 2014.
[4] W. Jiang, S. Ioannidis, L. Massoulie, and F. Picconi, "Orchestrating massively distributed cdns," in CoNEXT, 2012.
[5] M. Dehghan, A. Seetharam, B. Jiang, T. He, T. Salonidis, J. Kurose, D. Towsley, and R. Sitaraman, "On the complexity of optimal routing and content caching in heterogeneous networks," in INFOCOM, 2014.
[6] N. Laoutaris, S. Syntila, and I. Stavrakakis, "Meta methods for hierarchical web caches," in ICPCC, 2004.
[7] H. Che, Y. Tung, and Z. Wang, "Hierarchical web caching systems: Modeling, design and experimental results," Selected Areas in Communications, vol. 20, no. 7, pp. 1305-1314, 2002.
[8] Y. Zhou, Z. Chen, and K. Li, "Second-level buffer cache management," Parallel and Distributed Systems, vol. 15, no. 6, pp. 505-519, 2004.
[9] K. Shanmugam, N. Golrezaei, A. G. Dimakis, A. F. Molisch, and G. Caire, "Femtocaching: Wireless content delivery through distributed caching helpers," Transactions on Information Theory, vol. 59, no. 12, pp. 8402-8413, 2013.
[10] K. Naveen, L. Massoulie, E. Baccelli, A. Carneiro Viana, and D. Towsley, "On the interaction between content caching and request assignment in cellular cache networks," in ATC, 2015.
[11] K. Poularakis, G. Iosifidis, and L. Tassiulas, "Approximation caching and routing methods for massive mobile data delivery," in GLOBECOM, 2013.
[12] E. Cohen and S. Shenker, "Replication strategies in unstructured peerto-peer networks," in SIGCOMM, 2002.
[13] S. Ioannidis and P. Marbach, "Absence of evidence as evidence of absence: A simple mechanism for scalable p2p search," in INFOCOM, 2009.
[14] C. Fricker, P. Robert, and J. Roberts, "A versatile and accurate approximation for LRU cache performance," in ITC, 2012.
[15] V. Martina, M. Garetto, and E. Leonardi, "A unified approach to the performance analysis of caching systems," in INFOCOM, 2014.
[16] D. S. Berger, P. Gland, S. Singla, and F. Ciucu, "Exact analysis of TTL cache networks," IFIP Performance, 2014.
[17] N. C. Fofack, P. Nain, G. Neglia, and D. Towsley, "Analysis of TTL based cache networks," in VALUETOOLS, 2012.
[18] E. J. Rosensweig, J. Kurose, and D. Towsley, "Approximate models for general cache networks," in INFOCOM. IEEE, 2010, pp. 1-9.
[19] E. J. Rosensweig, D. S. Menasche, and J. Kurose, "On the steady-state of cache networks," in INFOCOM, 2013.
[20] S. Ioannidis and E. Yeh, "Adaptive caching networks with optimality guarantees," in Transactions on Networking, 2018.
[21] D. Rossi and G. Rossini, "Caching performance of content centric networks under multi-path routing (and more)," Telecom ParisTech, Tech. Rep., 2011.
[22] J. F. Kurose and K. W. Ross, Computer Networking: a Top-Down Approach. Addison Wesley, 2007.
[23] L. Fleischer, M. X. Goemans, V. S. Mirrokni, and M. Sviridenko, "Tight approximation methods for maximum general assignment problems," in SODA, 2006.
[24] S. Borst, V. Gupta, and A. Walid, "Distributed caching methods for content distribution networks," in INFOCOM, 2010.
[25] S. Podlipnig and L. Boszormenyi, "A survey of web cache replacement strategies," ACM Computing Surveys (CSUR), vol. 35, no. 4, pp. 374-398, 2003.
[26] B. Nitzberg and V. Lo, "Distributed shared memory: A survey of issues and methods," Computer, vol. 24, no. 8, pp. 52-60, 1991.
[27] S. Albers, "Online methods: a survey," Mathematical Programming, vol. 97, no. 1-2, pp. 3-26, 2003.
[28] M. Dehghan, L. Massoulie, D. Towsley, D. Menasche, and Y. Tay, "A utility optimization approach to network cache design," in INFOCOM, 2015.
[29] N. Laoutaris, H. Che, and I. Stavrakakis, "The lcd interconnection of lru caches and its analysis," Performance Evaluation, vol. 63, no. 7, pp. 609-634, 2006.
[30] I. Psaras, W. K. Chai, and G. Pavlou, "Probabilistic in-network caching for information-centric networks," in ICN. ACM.
[31] Y. Wang, Z. Li, G. Tyson, S. Uhlig, and G. Xie, "Optimal cache allocation for content-centric networking," in 2013 21st IEEE International Conference on Network Protocols (ICNP). IEEE, 2013, pp. 1-10.
[32] G. Rossini and D. Rossi, "Coupling caching and forwarding: Benefits, analysis, and implementation," in Proceedings of the 1st international conference on Information-centric networking. ACM, 2014, pp. 127-136.
[33] I. Baev, R. Rajaraman, and C. Swamy, "Approximation methods for data placement problems," SIAM Journal on Computing, vol. 38, no. 4, pp. 1411-1429, 2008.
[34] Y. Bartal, A. Fiat, and Y. Rabani, "Competitive methods for distributed data management," Journal of Computer and System Sciences, vol. 51, no. 3, pp. 341-358, 1995.
[35] D. Applegate, A. Archer, V. Gopalakrishnan, S. Lee, and K. K. Ramakrishnan, "Optimal content placement for a large-scale VoD system," in CoNext, 2010.
[36] A. A. Ageev and M. I. Sviridenko, "Pipage rounding: A new method of constructing methods with proven performance guarantee," Journal of Combinatorial Optimization, vol. 8, no. 3, pp. 307-328, 2004.
[37] R. Chiocchetti, D. Rossi, G. Rossini, G. Carofiglio, and D. Perino, "Exploit the known or explore the unknown?: Hamlet-like doubts in ICN," in ICN, 2012.
[38] S. K. Fayazbakhsh, Y. Lin, A. Tootoonchian, A. Ghodsi, T. Koponen, B. Maggs, K. Ng, V. Sekar, and S. Shenker, "Less pain, most of the gain: Incrementally deployable icn," in ACM SIGCOMM Computer Communication Review, vol. 43, no. 4. ACM, 2013, pp. 147-158.
[39] G. Carofiglio, L. Mekinda, and L. Muscariello, "Joint forwarding and caching with latency awareness in information-centric networking," Computer Networks, vol. 110, pp. 133-153, 2016.

[40] N. Abedini and S. Shakkottai, "Content caching and scheduling in wireless networks with elastic and inelastic traffic," IEEE/ACM Transactions on Networking, vol. 22, no. 3, pp. 864-874, 2014.

[41] H. Xie, G. Shi, and P. Wang, "TECC: Towards collaborative in-network caching guided by traffic engineering," in INFOCOM, 2012.

[42] J. Edmonds, "Submodular functions, matroids, and certain polyhedra," Edited by G. Goos, J. Hartmanis, and J. van Leeuwen, vol. 11, 1970.

[43] G. L. Nemhauser, L. A. Wolsey, and M. L. Fisher, "An analysis of approximations for maximizing submodular set functionsi," Mathematical Programming, vol. 14, no. 1, pp. 265-294, December 1978.

[44] J. Vondrak, "Optimal approximation for the submodular welfare problem in the value oracle model," in STOC, 2008.

[45] G. Calinescu, C. Chekuri, M. Pal, and J. Vondrak, "Maximizing a submodular set function subject to a matroid constraint," in Integer programming and combinatorial optimization. Springer, 2007, pp. 182-196.

[46] "Maximizing a monotone submodular function subject to a matroid constraint," SIAM Journal on Computing, vol. 40, no. 6, pp. 1740-1766, 2011.

[47] A. Krause and D. Golovin, "Submodular function maximization," Tractability: Practical Approaches to Hard Problems, vol. 3, no. 19, p. 8, 2012.

[48] G. L. Nemhauser and L. A. Wolsey, "Best methods for approximating the maximum of a submodular set function," Mathematics of operations research, vol. 3, no. 3, pp. 177-188, 1978.

[49] J. Y. Yen, "Finding the k shortest loopless paths in a network," management Science, vol. 17, no. 11, pp. 712-716, 1971.

[50] D. Eppstein, "Finding the k shortest paths," SIAM Journal on computing, vol. 28, no. 2, pp. 652-673, 1998.

[51] C. E. Hopps, "Analysis of an equal-cost multi-path method," 2000, iETF RFC2992.

[52] J. He and J. Rexford, "Toward internet-wide multipath routing," IEEE network, vol. 22, no. 2, 2008.

[53] S. Vutukury and J. J. Garcia-Luna-Aceves, "Mdva: A distance-vector multipath routing protocol," in INFOCOM 2001. Twentieth Annual Joint Conference of the IEEE Computer and Communications Societies. Proceedings. IEEE, vol. 1. IEEE, 2001, pp. 557-564.

[54] M. K. Marina and S. R. Das, "On-demand multipath distance vector routing in ad hoc networks," in Network Protocols, 2001. Ninth International Conference on. IEEE, 2001, pp. 14-23.

[55] T. Cormen, C. Leiserson, R. Rivest, and C. Stein, Introduction to Methods. MIT Press, 2009.

[56] B. Blaszczyszyn and A. Giovanidis, "Optimal geographic caching in cellular networks," in ICC, 2015.

[57] M. X. Goemans and D. P. Williamson, "New ¾-approximation methods for the maximum satisfiability problem," SIAM Journal on Discrete Mathematics, vol. 7, no. 4, pp. 656-666, 1994.

[58] C. H. Papadimitriou and K. Steiglitz, Combinatorial optimization: methods and complexity. Courier Corporation, 1982.

[59] H. J. Kushner and G. Yin, Stochastic approximation and recursive methods and applications. Springer Science & Business Media, 2003, vol. 35.

[60] C. Michelot, "A finite method for finding the projection of a point onto the canonical simplex of Rn," Journal of Optimization Theory and Applications, vol. 50, no. 1, pp. 195-200, 1986.

[61] A. Nemirovski, Efficient methods in convex programming, 2005.

What is claimed is:

1. A network for delivering content, the network comprising:
   a processor operatively coupled to a memory device;
   network nodes configured by the processor to cache content in the memory device and to route a unit of content in response to a user request to deliver at least the unit of content to a destination node; and
   a controller configured by the processor to cause at least a subset of the network nodes to adapt caching and routing decisions, the controller configured to cause at least the subset of the network nodes to adapt the caching and routing decisions in a manner that minimizes, subject to parameters defined by a global caching and routing strategy, an aggregate expected cost of caching and routing at least the unit of content to deliver at least the unit of content to the destination node.

2. The network of claim 1, wherein the controller is further configured to adapt the caching and routing decisions based upon an objective function that includes a caching gain, and wherein the controller is centralized at a network management system communicatively coupled to the network nodes and configured to collect a rate of requests of multiple users via at least one of the network nodes, and wherein the controller is further configured to modify the caching gain based on the rate of requests.

3. The network of claim 1, wherein a given node of the network nodes includes a respective controller, the respective controller being configured to communicate messages to controllers at least at adjacent nodes of the given node, and wherein the respective controller is further configured to adapt the caching and routing decisions as a function of the caching and routing parameters exchanged with one or more controllers at the adjacent nodes.

4. The network of claim 3, wherein the respective controller is configured to further adapt the caching and routing decisions based on marginal gain of a caching gain that incrementally improves performance of the caching and routing decisions based on the caching and routing parameters.

5. The network of claim 1, wherein a given node of the network nodes performs a decision used to select a link of a path to the destination node, the link being between the given node and a node adjacent to the given node, and wherein the decision by the given node is made independently from a decision used to select a respective link by other nodes of the network nodes.

6. The network of claim 1, wherein the controller is configured to operate at the destination node and performs the caching and routing decisions to determine a path for delivery of the unit of content to the destination node.

7. The network of claim 1, wherein the destination node is the node at which the user entered the request, and where the controller at the destination node obtains the caching and routing parameters on an ongoing basis.

8. The network of claim 2, wherein the objective function is based on an assumption that the subset of network nodes includes caches of units or chunks thereof of equal size.

9. The network of claim 1, wherein the controller is further configured to reduce a cost associated with routing of the unit of content along a path to the destination node.

10. The network of claim 1, wherein the controller is further configured to further cause the one or more of the respective nodes to further adapt the caching and routing decisions based on retrieving the caching and routing parameters from given nodes of the network nodes where content associated with caching is located.

11. The network of claim 1, wherein the network nodes are configured to cache the content and to route the unit of content in response to a user request to deliver at least a chunk of the unit of content to the destination node.

12. A computer-implemented method for delivering content, the computer-implemented method comprising:
caching content and routing a unit of content, by network nodes, in response to a user request to deliver at least the unit of content to a destination node; and
causing, by a controller, at least a subset of the network nodes to adapt caching and routing decisions, and causing, by the controller, at least the subset of the network nodes to adapt the caching and routing decisions in a manner that minimizes, subject to parameters defined by a global caching and routing strategy, an aggregate expected cost of caching and routing at least the unit of content to deliver at least the unit of content to the destination node.

13. The method of claim 12, further comprising adapting the caching and routing decisions based upon an objective function that includes a caching gain, and wherein the controller is centralized at a network management system communicatively coupled to the network nodes, further comprising collecting a rate of requests of multiple users via at least one of the network nodes, and further comprising modifying, by the controller, the caching gain based on the rate of requests.

14. The method of claim 12, wherein a given node of the network nodes includes a respective controller, further comprising communicating, by the respective controller, messages to controllers at least at adjacent nodes of the given node, and further comprising adapting the caching and routing decisions, by the respective controller, as a function of the caching and routing parameters exchanged with one or more controllers at the adjacent nodes.

15. The method of claim 14, wherein further comprising adapting, by the respective controller, the caching and routing decisions based on marginal gain of a caching gain that incrementally improves performance of the caching and routing decisions based on the caching and routing parameters.

16. The method of claim 12, further comprising performing, by a given node of the network nodes, a decision used to select a link of a path to the destination node, the link being between the given node and a node adjacent to the given node, and further comprising making the decision, by the given node, independently from a decision used to select a respective link by other nodes of the network nodes.

17. The method of claim 12, further comprising operating the controller at the destination node, and performing, by the controller, caching and routing decisions to determine a path for delivery of the unit of content to the destination node.

18. The method of claim 12, wherein the destination node is the node at which the user entered the request, and further comprising obtaining, by the the controller at the destination node, the caching and routing parameters on an ongoing basis.

19. The method of claim 13, wherein the objective function is based on an assumption that the subset of network nodes includes caches of units or chunks thereof of equal size.

20. The method of claim 12, further comprising reducing, by a the controller, a cost associated with routing of the unit of content along a path to the destination node.

21. The method of claim 12, further comprising causing, by the controller, the one or more of the respective nodes to further adapt the caching and routing decisions based on retrieving the caching and routing parameters from given nodes of the network nodes where content associated with caching is located.

22. The method of claim 12, further comprising caching the content and routing the unit of content, by the network nodes, in response to a user request to deliver at least a chunk of the unit of content to the destination node.

23. A computer program product comprising:
a non-transitory computer-readable medium having instructions for delivering content stored thereon, the instructions, when loaded and executed by a processor, cause the processor to:
cache content and route a unit of content, by network nodes, in response to a user request to deliver at least the unit of content to a destination node; and
cause, by a controller, at least a subset of the network nodes to adapt caching and routing decisions, and cause, by the controller, at least the subset of the network nodes to adapt the caching and routing decisions minimizes, subject to parameters defined by a global caching and routing strategy, an aggregate expected cost of caching and routing at least the unit of content to deliver at least the unit of content to the destination node.

* * * * *